United States Patent
Noguchi et al.

(10) Patent No.: US 11,236,654 B2
(45) Date of Patent: Feb. 1, 2022

(54) CONSTRUCTION MACHINE

(71) Applicant: Hitachi Construction Machinery Tierra Co., Ltd., Koka (JP)

(72) Inventors: Shuuhei Noguchi, Higashiomi (JP); Hajime Yoshida, Omihachiman (JP); Tetsuya Nakabayashi, Omihachiman (JP)

(73) Assignee: Hitachi Construction Machinery Tierra Co., Ltd., Koka (JP)

( * ) Notice: Subject to any disclaimer, the term of this patent is extended or adjusted under 35 U.S.C. 154(b) by 441 days.

(21) Appl. No.: 16/330,611

(22) PCT Filed: Feb. 28, 2018

(86) PCT No.: PCT/JP2018/007637
§ 371 (c)(1),
(2) Date: Mar. 5, 2019

(87) PCT Pub. No.: WO2018/159718
PCT Pub. Date: Sep. 7, 2018

(65) Prior Publication Data
US 2021/0277813 A1 Sep. 9, 2021

(30) Foreign Application Priority Data
Mar. 1, 2017 (JP) .............................. JP2017-38378

(51) Int. Cl.
*F01N 3/025* (2006.01)
*F01N 13/00* (2010.01)
(Continued)

(52) U.S. Cl.
CPC .......... *F01N 3/0253* (2013.01); *F01N 3/033* (2013.01); *F01N 3/18* (2013.01); *F01N 9/002* (2013.01);
(Continued)

(58) Field of Classification Search
CPC .......... F01N 3/0253; F01N 3/033; F01N 3/18; F01N 13/009; F01N 2560/08;
(Continued)

(56) References Cited

U.S. PATENT DOCUMENTS

2009/0193904 A1  8/2009  Takahashi et al.
2014/0326529 A1* 11/2014  Noguchi ............. F01N 13/0097
                                                    180/309
(Continued)

FOREIGN PATENT DOCUMENTS

EP    1 741 885 A2    1/2007
JP    2006-322375 A   11/2006
(Continued)

OTHER PUBLICATIONS

International Search Report (PCT/ISA/210) issued in PCT Application No. PCT/JP2018/007637 dated May 22, 2018 with English translation (four (4) pages).
(Continued)

*Primary Examiner* — Devon C Kramer
*Assistant Examiner* — Kelsey L Stanek
(74) *Attorney, Agent, or Firm* — Crowell & Moring LLP

(57) ABSTRACT

A filter (30) traps particulate matter in an exhaust gas. A filter inlet side pressure sensor (34) is provided in an inlet side of the filter (30). An EGR valve inlet side pressure sensor (22) is provided in an inlet side of an EGR valve (20). A regeneration controller (38C) determines whether or not the filter inlet side pressure sensor (34) is in failure based upon a difference between a pressure value detected by the filter inlet side pressure sensor (34) and a pressure value detected by the EGR valve inlet side pressure sensor (22). When the filter inlet side pressure sensor (34) is in failure, the regeneration controller (38C) performs control of regeneration treatment using a differential pressure calculated based upon
(Continued)

a pressure value detected by the EGR valve inlet side pressure sensor (22) and a pressure value detected by the filter outlet side pressure sensor (35).

6 Claims, 8 Drawing Sheets

(51) Int. Cl.
    *F02M 26/15*     (2016.01)
    *F02M 26/47*     (2016.01)
    *F01N 3/033*     (2006.01)
    *F01N 3/18*     (2006.01)
    *F01N 9/00*     (2006.01)

(52) U.S. Cl.
    CPC ........... *F01N 13/009* (2014.06); *F02M 26/15* (2016.02); *F02M 26/47* (2016.02); *F01N 2560/08* (2013.01); *F01N 2560/14* (2013.01); *F01N 2590/08* (2013.01)

(58) Field of Classification Search
    CPC . F01N 2560/14; F01N 2590/08; F02M 26/15; F02M 26/47
    USPC .......................................................... 60/295
    See application file for complete search history.

(56) References Cited

U.S. PATENT DOCUMENTS

| | | | |
|---|---|---|---|
| 2016/0103032 A1* | 4/2016 | Nakano | G01M 15/14 |
| | | | 73/112.01 |
| 2016/0341142 A1* | 11/2016 | Taibi | F01N 9/002 |
| 2018/0347434 A1* | 12/2018 | Michel | F01N 11/00 |

FOREIGN PATENT DOCUMENTS

| | | |
|---|---|---|
| JP | 2010-65577 A | 3/2010 |
| JP | 2015-31187 A | 2/2015 |
| JP | 2016-109058 A | 6/2016 |
| WO | WO 2008/078577 A1 | 7/2008 |
| WO | WO 2013/105372 A1 | 7/2013 |
| WO | WO 2015/001955 A1 | 1/2015 |

OTHER PUBLICATIONS

Japanese-language Written Opinion (PCT/ISA/237) issued in PCT Application No. PCT/JP2018/007637 dated May 22, 2018 (three (3) pages).

* cited by examiner

CONSTRUCTION MACHINE

TECHNICAL FIELD

The present invention relates to a construction machine that is provided with an exhaust gas purifying device, for example.

BACKGROUND ART

A construction machine such as a hydraulic excavator or a hydraulic crane is generally provided with a diesel engine mounted thereon as an engine operating as a prime mover. There are some cases where harmful substances such as particulate matter (PM) and nitrogen oxides (NOx) are contained in an exhaust gas exhausted from such a diesel engine. Therefore, the construction machine is provided with an exhaust gas purifying device in an exhaust pipe forming an exhaust gas passage of the engine for purifying the exhaust gas therein.

The exhaust gas purifying device includes an oxidation catalyst (for example, a Diesel Oxidation Catalyst, also referred to as "DOC" for short) for oxidizing and removing nitrogen monoxides (NO), carbon monoxides (CO), hydrocarbons (HC) and the like that are contained in the exhaust gas, and a particulate matter removing filter (for example, a Diesel Particulate Filter, also referred to as "DPF" for short) that is disposed downstream of the oxidation catalyst for trapping and removing particulate matter in the exhaust gas (Patent Document 1).

Incidentally, in the particulate matter removing filter, the particulate matter is accumulated in the filter following the trapping of the particulate matter, which might cause the filter to be clogged. Therefore, in a point where a predetermined quantity of the particulate matter is trapped, it is necessary to remove the particulate matter from the filter and regenerate the filter. This regeneration of the filter can be performed in such a manner that fuel injection for regeneration treatment, which is called, for example, "post injection", is performed to increase a temperature of an exhaust gas and burn the particulate matter that is accumulated in the filter.

On the other hand, when the regeneration of the filter is performed in a state where the particulate matter is excessively accumulated in the filter (excess accumulation), the temperature of the exhaust gas rises to be excessively high (a combustion temperature of the particulate matter is excessively high), which might possibly cause the filter to be melted and damaged. Therefore, according to the conventional art, a trapping quantity of the particulate matter to be trapped in the filter is estimated (calculated), and, based thereon, the regeneration treatment is automatically performed before the estimated trapping quantity becomes excessively large, that is, when the estimated trapping quantity reaches a predetermined threshold value (Patent Document 2).

Here, the exhaust gas purifying device is provided with various kinds of sensors. On the other hand, in a narrow mounting space of the construction machine, not only heat of the engine is generated but also the exhaust gas purifying device is also highly heated. Therefore, electric components not resistant to heat are possibly affected by the heat generation from the engine and the exhaust gas purifying device each. In addition, the construction machine is possibly subjected to an adverse influence that due to vibrations generated at the traveling or working of the construction machine, a sensor substrate or a harness connection part is loosened.

In a case where the various kinds of sensors provided in the exhaust gas purifying device are in drawback due to troubles or malfunctions thereof, there is a possibility that the estimation of the trapping quantity of the particulate matter trapped in the filter of the exhaust gas purifying device is not correctly made. In such a case, this incorrect estimation possibly leads to a malfunction of regeneration treatment in the exhaust gas purifying device or melting and damage of the filter due to an excessive temperature rise of the filter.

To cope with these problems, Patent Document 2 discloses, for example, the technique in which at the time of detecting abnormality of the device affecting calculation accuracy of the corrected quantity estimation, output torque of the engine is immediately controlled by failsafe control and after that, the operation is stopped.

PRIOR ART DOCUMENT

Patent Document

Patent Document 1: Japanese Patent Laid-Open No. 2010-65577 A

Patent Document 2: Japanese Patent Laid-Open No. 2006-322375 A

SUMMARY OF INVENTION

When the estimation of the trapping quantity of the particulate matter is not correctly made following the drawback caused by the trouble or the malfunction of the various kinds of sensors provided in the exhaust gas purifying device, even when the filter still has a sufficient allowance to the extent of the excess trap of the particulate matter, a process of forcibly prompting the regeneration treatment is possibly executed. In addition, when the fuel injection quantity is immediately limited by the failsafe control, for example, even in a case where an operator tries to drive the construction machine from a working site to a maintenance site, the engine is stopped (stalled), creating a possibility of being incapable of moving the construction machine.

An object of the present invention is to provide a construction machine that can continue to operate the work even when a sensor (filter inlet side sensor) in a construction machine gets in failure.

A construction machine according to the present invention comprises an engine that is mounted on a vehicle body, an engine controller that performs control of the engine, an intake manifold that intakes outside air into the engine, an exhaust manifold that exhausts an exhaust gas from the engine, an EGR pipe that recirculates a part of the exhaust gas in the exhaust manifold from the exhaust manifold to the intake manifold, an EGR valve that is provided in the EGR pipe to adjust a flow quantity of the exhaust gas passing through the EGR pipe, an EGR valve inlet side pressure sensor that is provided in an inlet side of the EGR valve, an EGR valve outlet side pressure sensor that is provided in an outlet side of the EGR valve, an EGR controller that calculates a differential pressure between a pressure value detected by the EGR valve inlet side pressure sensor and a pressure value detected by the EGR valve outlet side pressure sensor and performs control of an opening degree of the EGR valve based upon the differential pressure, an exhaust gas purifying device that is provided in an exhaust side of the engine and has a filter that traps the particulate matter in the exhaust gas exhausted from the engine, a regeneration device that performs regeneration treatment of the filter by burning the particulate matter trapped in the filter of the exhaust gas purifying device, the regeneration device including a filter inlet side pressure sensor that is provided in an inlet side of the filter, a filter outlet side pressure sensor that is provided in an outlet side of the filter, and a regeneration controller that calculates a differential pressure between a pressure value detected by the filter inlet side pressure sensor and a pressure value detected by the filter outlet side pressure sensor and performs control of the regeneration treatment of the filter based upon this differential pressure.

For solving the aforementioned problem, according to the construction machine in the present invention, the regeneration controller determines whether or not the filter inlet side pressure sensor is in failure based upon a difference between the pressure value detected by the filter inlet side pressure sensor and the pressure value detected by the EGR valve inlet side pressure sensor, and when it is determined that the filter inlet side pressure sensor is in failure, the regeneration controller performs the control of the regeneration treatment using a differential pressure calculated based upon the pressure value detected by the EGR valve inlet side pressure sensor and the pressure value detected by the filter outlet side pressure sensor.

According to the present invention, it is possible to continue the work even when the filter inlet side pressure sensor is in failure.

That is, when it is determined that the filter inlet side pressure sensor is in failure, the regeneration controller uses the EGR valve inlet side pressure sensor in place of the filter inlet side pressure sensor as a pressure sensor used in the regeneration device. That is, the regeneration controller performs the control of the regeneration treatment using the differential pressure calculated based upon the pressure value detected by the EGR valve inlet side pressure sensor and the pressure value detected by the filter outlet side pressure sensor. Therefore, it is possible to continue the operation by making up for the failure of the filter inlet side pressure sensor with the EGR valve inlet side pressure sensor. Consequently, even when the filter inlet side pressure sensor is in failure, it is possible to continue the work by the construction machine.

MODE FOR CARRYING OUT THE INVENTION

Hereinafter, embodiments of a construction machine according to the present invention will be in detail explained with reference to the accompanying drawings by taking a case where the construction machine is applied to a compact hydraulic excavator as an example.

In the present embodiment, among the compact hydraulic excavator, there is exemplified a backward ultra-small revolving machine in which a counterweight mounted in the rear side is formed in an arc shape and that is capable of revolving in a state where the rear side of an upper revolving structure is accommodated within the vehicle width of a lower traveling structure. On the other hand, the compact hydraulic excavator is applied to an ultra-small revolving machine (for example, an offset hydraulic excavator of an ultra-small revolving type) in which an entire upper revolving structure is formed in a circular shape in a plan view and the upper revolving structure and a front device in a tilted and lifted state (in a small revolving posture) are capable of revolving in a state of being accommodated within the vehicle width of a lower traveling structure (for example, the upper revolving structure and the front device can fully revolve within 120% to 130% of the vehicle width).

Figure 1:
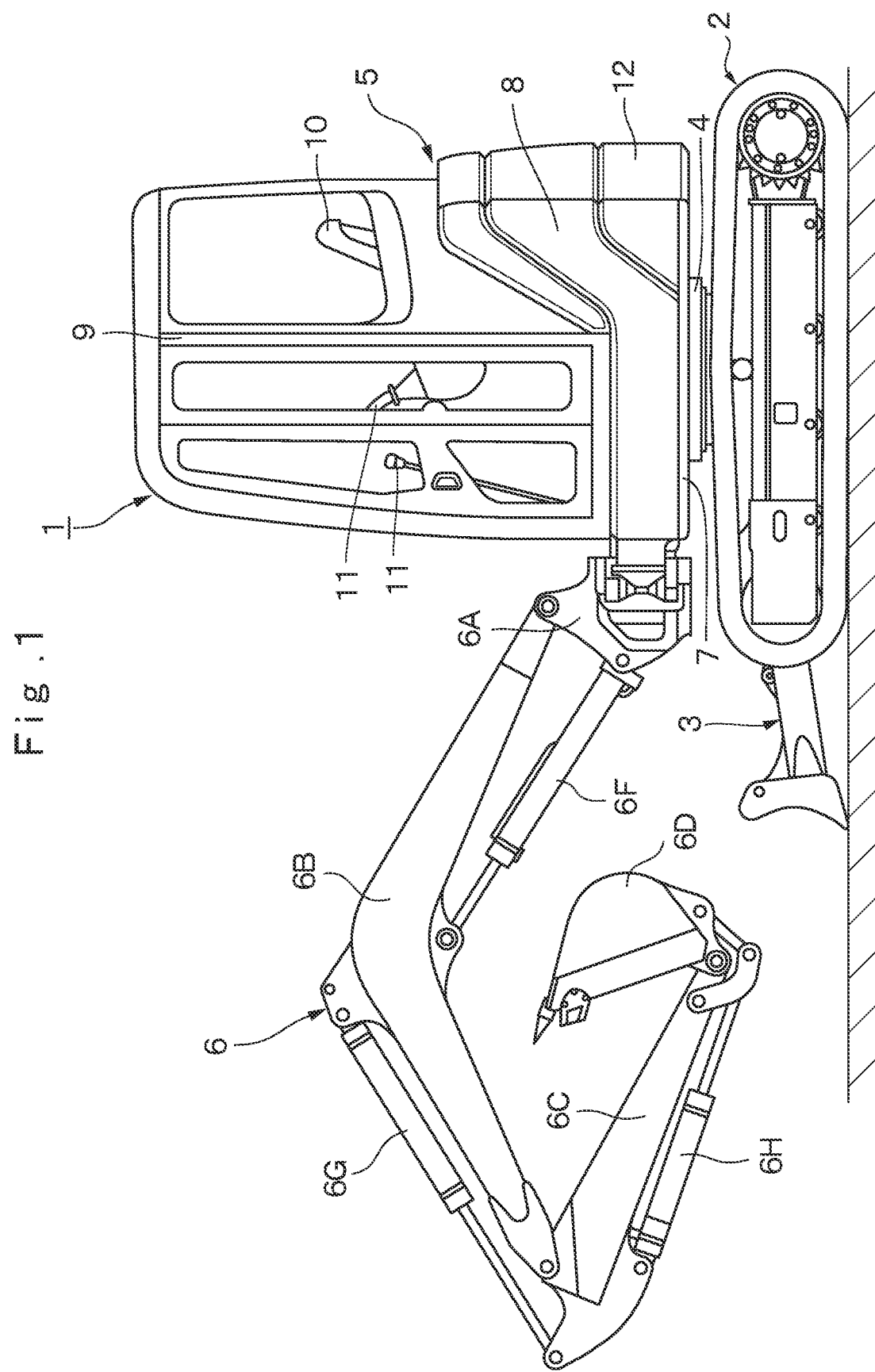
FIG. 1 is a front view showing a hydraulic excavator according to an embodiment of the present invention.

FIG. 1 to FIG. 5 show a first embodiment. In FIG. 1, a hydraulic excavator 1 as a construction machine is a compact hydraulic excavator called "mini excavator" that is suitable for works in a narrow working site. Such a compact hydraulic excavator 1 is transported to a working site in a state of being loaded on a truck and is used in an excavating work in a narrow site, such as a ditch digging work on the side of the road in a city street and a demolish work in the inside of a building. Therefore, a machine weight of the compact hydraulic excavator 1 is suppressed to the degree of 0.7 to 8 tons.

The hydraulic excavator 1 is configured as a hydraulic excavator in a cab specification. The hydraulic excavator 1 is configured by an automotive crawler type of lower traveling structure 2, a blade device 3 that is mounted on the lower traveling structure 2 to be capable of swinging in a upper-lower direction, an upper revolving structure 5 that is mounted through a revolving device 4 on the lower traveling structure 2 to be capable of revolving thereon and a front device 6 that is provided to be capable of lifting and tilting on the upper revolving structure 5.

The lower traveling structure 2 and the upper revolving structure 5 configure a vehicle body of the hydraulic excavator 1. The front device 6 is mounted on a front side of the upper revolving structure 5 configuring the vehicle body. The hydraulic excavator 1 can perform an excavating work of sand and earth using the front device 6 and can perform a blade work blading the excavated sand and earth or the like, and a snow-removal work or the like using the blade device 3.

Here, the front device 6 is formed as a swing post type working mechanism (front working machine). The front device 6 is provided with, for example, a swing post 6A, a boom 6B, an arm 6C, a bucket 6D as a working tool, a swing cylinder 6E (refer to FIG. 2) for swinging the front device 6 in the left-right direction, a boom cylinder 6F, an arm cylinder 6G, a bucket cylinder 6H and the like. On the other hand, the upper revolving structure 5 is configured by a revolving frame 7, an exterior cover 8, a cab 9, and a counterweight 12.

The revolving frame 7 forms part of a support structure of the upper revolving structure 5. The revolving frame 7 is mounted through the revolving device 4 on the lower traveling structure 2. The revolving frame 7 is provided with the counterweight 12 and an engine 13 in the rear part side, the cab 9 in the left front side and a fuel tank 25 in the right front side. The revolving frame 7 is provided with the exterior cover 8 from the right side over the rear side of the cab 9. The exterior cover 8 defines a space that accommodates therein the engine 13, a hydraulic pump 24, a heat exchanger 26, an exhaust gas purifying device 27 and the like, together with the revolving frame 7, the cab 9 and the counterweight 12.

The cab 9 is mounted in the left front side of the revolving frame 7 and the cab 9 defines therein an operator's room in which an operator gets. An operator's seat 10 on which the operator is seated, various control levers 11, a notification device 37 which will be described later (refer to FIG. 3) and the like are arranged in the inside of the cab 9.

Figure 2:
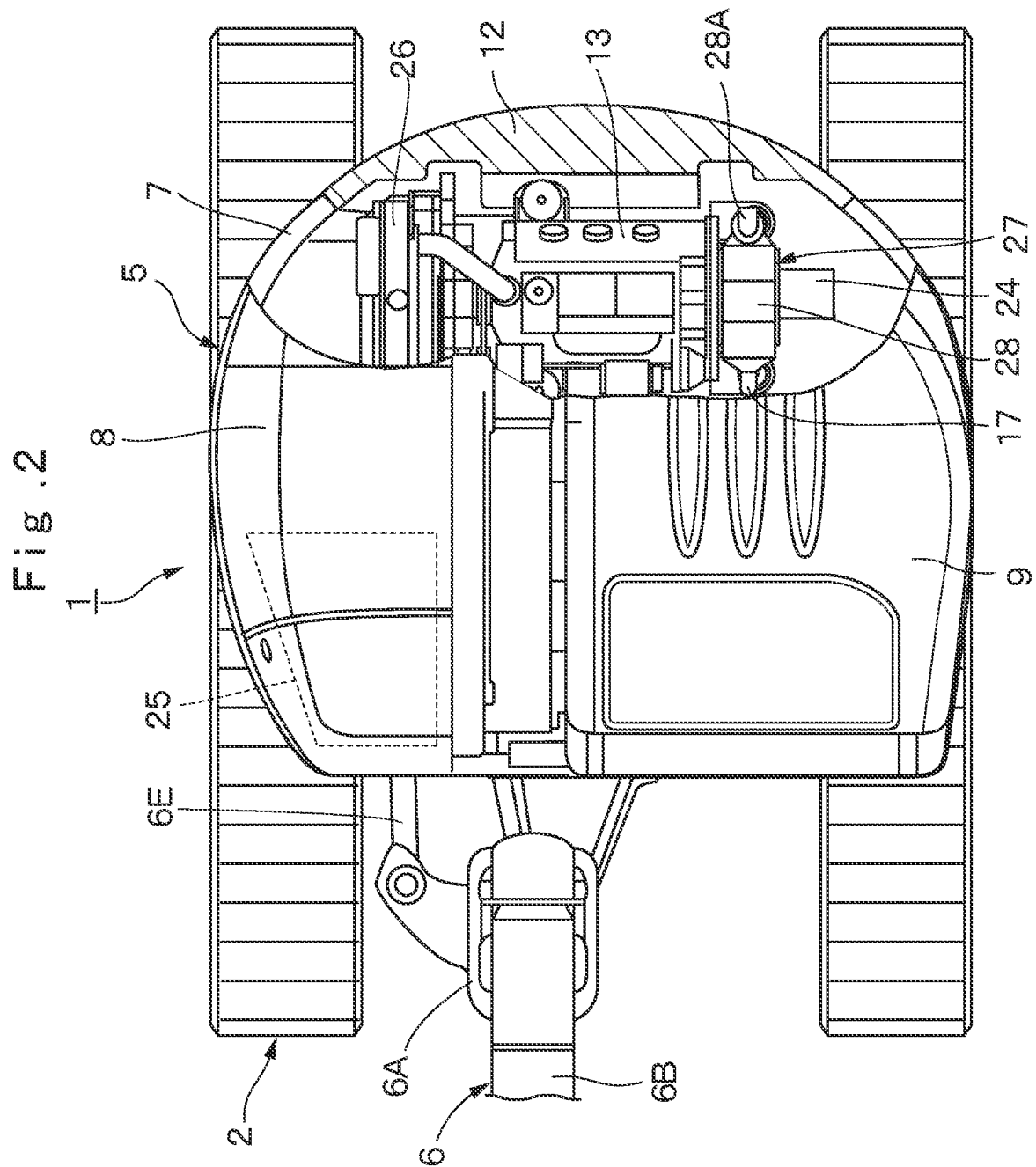
FIG. 2 is a partial cutaway plan view in which the hydraulic excavator is enlarged in a state where a cab and an exterior cover are partially removed from an upper revolving structure in FIG. 1.

The counterweight 12 acts as a weight balance to the front device 6. The counterweight 12 is mounted at the rear end part of the revolving frame 7 to be positioned in the rear side of the engine 13. As shown in FIG. 2, the counterweight 12 is formed in a circular shape on the rear surface side. Consequently, the counterweight 12 is configured to be accommodated within a vehicle width of the lower traveling structure 2.

The engine 13 is disposed in the rear side of the revolving frame 7 in a transversely placed state. The engine 13 is mounted on the vehicle body (upper revolving structure 5) of the hydraulic excavator 1 as a motor (driving source). The engine 13 is an internal combustion engine for burning fuel in combustion chambers in the inside, and is configured by a compact diesel engine, for example. The engine 13 is provided with an intake pipe 14 (refer to FIG. 3) for taking in outside air and an exhaust pipe 17 forming a part of an exhaust gas passage for discharging an exhaust gas.

The intake pipe 14 has an intake manifold 14A configured to include a plurality of branch pipes. The intake manifold 14A is a component (intake manifold) for taking outside air in the combustion chambers in the engine 13. An air cleaner 15 for purifying outside air is provided on a tip end side of the intake pipe 14 to be connected thereto. An intake throttle valve 16 is provided in the halfway section of the intake pipe 14 to open/close by a control signal from a control device 38 to be described later. The intake throttle valve 16 adjusts a flow quantity of outside air passing through the intake pipe 14, that is, a flow quantity of outside air to be supplied to the engine 13.

On the other hand, an exhaust pipe 17 has an exhaust manifold 17A configured to include a plurality of branch pipes. The exhaust manifold 17A is a component (exhaust manifold) for exhausting exhaust gases from the combustion chambers in the engine 13. The exhaust gas purifying device 27 which will be described later is provided to be connected to the exhaust pipe 17.

Here, the engine 13 is driven by injection of fuel. That is, the engine 13 is configured by an electronically controlled engine, and a supply quantity of fuel thereto is variably controlled by a fuel injection device 18 (refer to FIG. 3) including an electronically controlled injection valve. The fuel injection device 18 variably controls an injection quantity of fuel (fuel injection quantity) to be injected into cylinders (not shown) of the engine 13 based upon a control signal that is outputted from the control device 38 which will be described later.

Further, the fuel injection device 18 configures part of a regeneration device 31 which will be described later together with the control device 38 and the like. The fuel injection device 18 performs fuel injection (additional injection after a combustion process) for regeneration treatment called "post injection", for example, in response to a control signal of the control device 38. This post injection increases a temperature of an exhaust gas to burn and remove the particulate matter accumulated in a particulate matter removing filter 30 in the exhaust gas purifying device 27.

An EGR pipe 19 is a recirculation pipe that is provided between the intake pipe 14 and the exhaust pipe 17. That is, the EGR pipe 19 recirculates a part of an exhaust gas exhausted into the exhaust pipe 17 from the engine 13 to the intake pipe 14 (EGR: exhaust gas recirculation). In other words, the EGR pipe 19 recirculates a part of the exhaust gas in the exhaust manifold 17A from the exhaust manifold 17A to the intake manifold 14A. An EGR valve 20 that opens/closes in response to a control signal from the control device 38 which will be described later is provided in the halfway section of the EGR pipe 19. The EGR valve 20 adjusts a flow quantity of the exhaust gas passing through the EGR pipe 19. That is, the EGR valve 20 is an exhaust gas recirculation valve that adjusts a recirculation quantity of the exhaust gas recirculating from the exhaust pipe 17 to the intake pipe 14, and recirculates a part of the exhaust gas to the intake side, which enables nitrogen oxides (NOx) in the exhaust gas to be reduced.

In this case, the EGR pipe 19 is provided with an EGR differential pressure sensor 21 to detect an EGR differential pressure as a difference between a pressure in an inlet side (an upstream side and exhaust side) and a pressure in an outlet side (a downstream side and intake side) of the EGR valve 20. The EGR differential pressure sensor 21 includes an EGR valve inlet side pressure sensor 22 provided in the inlet side of the EGR valve 20 and an EGR valve outlet side pressure sensor 23 provided in the outlet side of the EGR valve 20. The EGR differential pressure sensor 21, that is, the EGR valve inlet side pressure sensor 22 and the EGR valve outlet side pressure sensor 23 are connected electrically to the control device 38 to be described later. The control device 38 calculates a differential pressure from a pressure value detected by the EGR valve inlet side pressure sensor 22 and a pressure value detected by the EGR valve outlet side pressure sensor 23, and performs control of the opening degree of the EGR valve 20 based upon the differential pressure.

The hydraulic pump 24 is mounted to the left side of the engine 13. The hydraulic pump 24 forms a hydraulic source together with a hydraulic tank (not shown). The hydraulic pump 24 is driven by the engine 13 to deliver pressurized oil (hydraulic oil) toward a control valve device (not shown) formed of a plurality of control valves. The hydraulic pump 24 is configured by, for example, a swash plate type, bent axis type or radial piston type hydraulic pump of a variable displacement type. It should be noted that the hydraulic pump 24 is not necessarily limited to the hydraulic pump of a variable displacement type, but may be configured by using a hydraulic pump of a fixed displacement type.

The fuel tank 25 is positioned in the right side to the cab 9 and is provided on the revolving frame 7. The fuel tank 25 is covered with the exterior cover 8 together with the unillustrated hydraulic tank and the like. The fuel tank 25 is formed as a pressure resistant tank in a cuboidal body, for example, and reserves therein fuel to be supplied to the engine 13.

The heat exchanger 26 is positioned in the right side to the engine 13 and is provided on the revolving frame 7. The heat exchanger 26 includes, for example, a radiator, an oil cooler, and an intercooler. The heat exchanger 26 performs cooling of cooling water in the engine 13, as well as cooling of pressurized oil (hydraulic oil) that will be returned back to the hydraulic oil tank.

Next, an explanation will be made of the exhaust gas purifying device 27 for purifying an exhaust gas exhausted from the engine 13.

The exhaust gas purifying device 27 is provided in the exhaust side to the engine 13. As shown in FIG. 2, the exhaust gas purifying device 27 is disposed in the upper part left side to the engine 13 in a position above the hydraulic pump 24, for example, and is connected at the upstream side to the exhaust pipe 17 of the engine 13. The exhaust gas purifying device 27 forms part of an exhaust gas passage together with the exhaust pipe 17 and removes harmful substances contained in the exhaust gas during a period where the exhaust gas flows from the upstream side to the downstream side of the exhaust gas passage. More specifically, the particulate matter in the exhaust gas exhausted from the engine 13 is trapped by a particulate matter removing filter 30.

That is, the engine 13 composed of a diesel engine has a high efficiency and is excellent in durability, but harmful substances such as particulate matter (PM), nitrogen oxides (NOx), and carbon monoxides (CO) are contained in the exhaust gas from the engine 13. Therefore, as shown in FIG. 3, the exhaust gas purifying device 27 mounted in the exhaust pipe 17 includes an oxidation catalyst 29 for oxidizing and removing carbon monoxides (CO) or the like in the exhaust gas and the particulate matter removing filter 30 for trapping and removing particulate matter (PM) in the exhaust gas.

Figure 3:
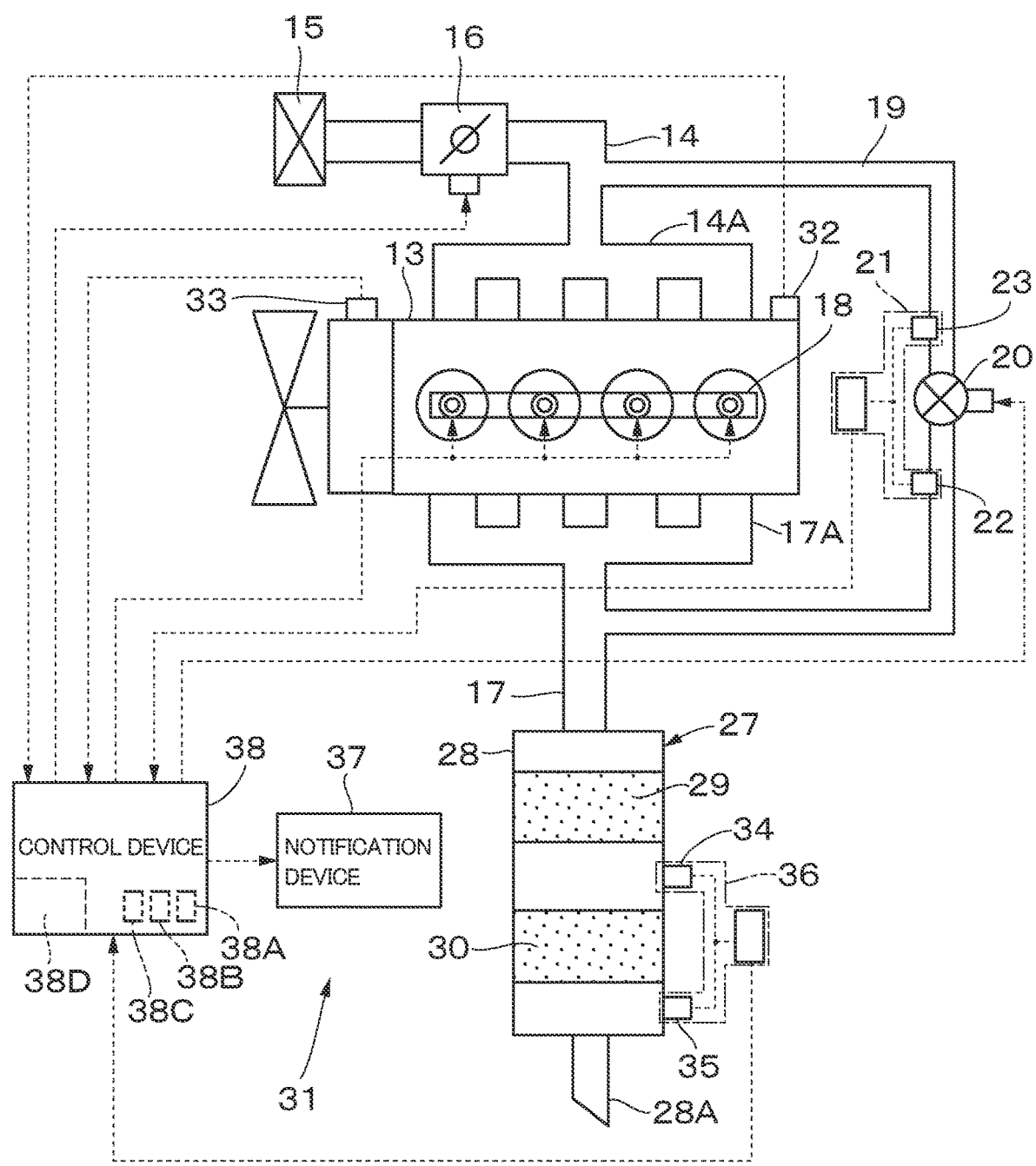
FIG. 3 is a configuration diagram showing an engine, an exhaust gas purifying device, a regeneration device, a control device and the like according to a first embodiment.

As shown in FIG. 3, the exhaust gas purifying device 27 is provided with a tubular casing 28 configured by removably connecting a plurality of tubular bodies before and after. The oxidation catalyst 29 called "DOC" and the particulate matter removing filter 30 (hereinafter, referred to as "filter 30") as a filter called "DPF" are removably accommodated in the casing 28. An exhaust port 28A is positioned downstream of the filter 30 and is connected to the outlet side of the casing 28. The exhaust port 28A includes a chimney pipe for releasing the exhaust gas subjected to purifying treatment into air, and a muffler, for example.

The oxidation catalyst 29 comprises a cell-shaped tubular body made of ceramic having an outer diameter dimension that is equivalent to an inner diameter dimension of the casing 28, for example. Many through holes (not shown) are axially formed in the oxidation catalyst 29, an inner surface of which is coated with a noble metal. The oxidation catalyst 29 oxidizes and removes carbon monoxides (CO), hydrocarbons (HC), and the like contained in the exhaust gas, and removes, for example, nitrogen oxides (NO) as nitrogen dioxides (NO2) by circulating an exhaust gas into each through hole under a predetermined temperature condition.

On the other hand, the filter 30 is disposed downstream of the oxidation catalyst 29 in the casing 28. The filter 30 traps the particulate matter in the exhaust gas exhausted from the engine 13, and burns and removes the trapped particulate matter to perform purification of the exhaust gas. Therefore, the filter 30 is configured by a cell-shaped tubular body formed by axially providing many small bores (not shown) to a porous member made of a ceramic material, for example. Thereby, the filter 30 traps particulate matter through many small bores, and the trapped particulate matter is burned and removed by regeneration treatment of the regeneration device 31 which will be described later. As a result, the filter 30 is regenerated.

Next, an explanation will be made of the regeneration device 31 that performs the regeneration of the filter 30.

The regeneration device 31 performs the regeneration of the filter 30 by burning the particulate matter trapped in the filter 30 in the exhaust gas purifying device 27. The regeneration device 31 includes the above-mentioned fuel injection device 18, rotational sensors 32, 33, pressure sensors 34, 35 and the control device 38, which will be described later. The regeneration device 31 automatically performs the regeneration of the filter 30 without being based upon an operation of an operator. That is, the regeneration device 31 performs the post injection by the fuel injection device 18 in response to a command signal (control signal) of the control device 38. With this post injection, a temperature of the exhaust gas in the exhaust pipe 17 is increased to burn and remove the particulate matter accumulated in the filter 30.

The rotational sensors 32, 33 are sensors provided for detecting a rotational speed N of the engine 13 and a position of a piston. In this case, one rotational sensor 32 is provided in a flywheel part of the engine 13, for example, and is used for detecting the rotational speed N of the engine 13. The other rotational sensor 33 is provided in a gear case of the engine 13, for example, and is used for identification of an engine cylinder (detection on which piston is at the top dead center or the like). The rotational sensor 32 detects a rotational speed N of the engine 13 and outputs the detection signal to the control device 38. The rotational sensor 33 is called also a cam sensor, and detects a rotational position corresponding to the position of the piston in the engine 13 and outputs the detection signal to the control device 38.

The control device 38 determines timing of fuel injection by the fuel injection device 18 based upon the position (rotational position corresponding thereto) of the piston detected by the rotational sensor 33 and outputs a command of necessary fuel injection to the fuel injection device 18. In addition, the control device 38 estimates a trapping quantity of the particulate matter trapped in the filter 30 based upon, for example, an engine rotational speed N detected by the rotational sensor 32, a fuel injection quantity F injected by the fuel injection device 18, and an exhaust gas temperature detected by an exhaust gas temperature sensor (not shown) provided in the exhaust gas purifying device 27. Further, the control device 38 determines whether or not the regeneration of the filter 30 is performed based upon a first estimated trapping quantity H1 that is the estimated trapping quantity.

It should be noted that the fuel injection quantity F can be found, for example, from an intake air quantity detected from, for example, an air flow meter provided in the intake side of the engine 13 and an engine rotational speed N. Besides, the fuel injection quantity F can be calculated also from a control signal (fuel injection command) that is outputted to the fuel injection device 18 from the control device 38, for example.

Pressure sensors 34, 35 are provided in the casing 28 of the exhaust gas purifying device 27. The pressure sensors 34, 35 configure a DPF differential pressure sensor 36 for detecting a DPF differential pressure as a difference between a pressure in the inlet side (upstream side) and a pressure in the outlet side (downstream side) of the filter 30. In this case, as shown in FIG. 3, the filter inlet side pressure sensor 34 is provided in the inlet side (upstream side) of the filter 30 and the filter outlet side pressure sensor 35 is provided in the outlet side (downstream side) of the filter 30. The filter inlet side pressure sensor 34 and the filter outlet side pressure sensor 35 are connected electrically to the control device 38, and a detection signal of the filter inlet side pressure sensor 34 and a detection signal of the filter outlet side pressure sensor 35 are outputted to the control device 38.

The control device 38 calculates a differential pressure $\Delta Ph$ by a pressure value P1 in the filter inlet side detected by the filter inlet side pressure sensor 34 and a pressure value P2 in the filter outlet side detected by the filter outlet side pressure sensor 35. Along with it, the control device 38 estimates a trapping quantity of the particulate matter trapped in the filter 30 based upon the differential pressure $\Delta Ph$, the temperature of the exhaust gas and the exhaust gas flow quantity. The control device 38 can determine whether or not the regeneration of the filter 30 is performed based upon a first estimated trapping quantity H1 that is the estimated trapping quantity.

A notification device 37 is provided near an operator's seat 10 in the cab 9. The notification device 37 is connected electrically to the control device 38. The notification device 37 notifies an operator of necessary information based upon a command (notification signal) from the control device 38. For example, the notification device 37, as described later, notifies that the filter inlet side pressure sensor 34 is in failure, that the EGR valve inlet side pressure sensor 22 is used instead of the filter inlet side pressure sensor 34, and the like. Here, the notification device 37 may be configured by a buzzer for generating a notification sound, a light or monitor for displaying a notification content, or the like. The notification device 37, for example, in a case where the control device 38 determines that the filter inlet side pressure sensor 34 is in failure, notifies an operator of the occurrence of the failure by generating a notification sound, an alarm display or the like based upon a command (notification signal) from the control device 38. In this embodiment, the notification device 37 is formed by a monitor displaying the notification content to the operator.

Next, an explanation will be made of the control device 38 that performs the control of the engine 13, the EGR valve 20, the regeneration device 31 and the like.

The control device 38 is a control unit (ECU) including a microcomputer, a power source circuit, a driving circuit and the like. The control device 38 also includes an engine controller 38A performing engine control, an EGR controller 38B performing control of an opening degree of the EGR valve 20 and a regeneration controller 38C performing control of regeneration treatment of the filter 30. That is, the control device 38 incorporates therein a function of the engine controller 38A, a function of the EGR controller 38B and a function of the regeneration controller 38C.

In this embodiment, the engine controller 38A, the EGR controller 38B and the regeneration controller 38C are configured as the single control device 38, that is, as a single control unit. However, each of the engine controller 38A, the EGR controller 38B and the regeneration controller 38C may be configured by a different controller. In this case, the respective controllers 38A, 38B, 38C are connected to each other through communication lines or the like, and thus intercommunication (multiplex communication) is made possible between the controllers.

In any case, the control device 38 in which the engine controller 38A is incorporated performs the control of the engine 13 by variably adjusting an opening degree of the intake throttle valve 16, fuel injection timing and a fuel injection quantity of the fuel injection device 18, and the like. The control device 38 in which the EGR controller 38B is incorporated performs control of an opening degree of the EGR valve 20 based upon a differential pressure detected by the EGR valve inlet side pressure sensor 22 and the EGR valve outlet side pressure sensor 23. In this case, the control device 38 (EGR controller 38B) calculates a differential pressure as a difference between a pressure value detected by the EGR valve inlet side pressure sensor 22 and a pressure value detected by the EGR valve outlet side pressure sensor 23 and performs the control of the opening degree of the EGR valve 20 based upon the differential pressure. The control device 38 in which the regeneration controller 38C is incorporated performs control of regeneration treatment of the filter 30 based upon a differential pressure detected by the filter inlet side pressure sensor 34 and the filter outlet side pressure sensor 35. In this case, the control device 38 (regeneration controller 38C) calculates a differential pressure $\Delta Ph$ as a difference between a pressure value P1 detected by the filter inlet side pressure sensor 34 and a pressure value P2 detected by the filter outlet side pressure sensor 35 and performs the control of the regeneration treatment of the filter 30 (for example, determination of start of the regeneration treatment) based upon the differential pressure $\Delta Ph$.

Therefore, an inlet side of the control device 38 is connected electrically to the fuel injection device 18, the EGR valve inlet side pressure sensor 22, the EGR valve outlet side pressure sensor 23, the rotational sensors 32, 33, the filter inlet side pressure sensor 34, the filter outlet side pressure sensor 35, an unillustrated air flow meter, the exhaust gas temperature sensor and the like. On the other hand, an outlet side of the control device 38 is connected electrically to the fuel injection device 18, the intake throttle valve 16, the EGR valve 20, the notification device 37 and the like.

The microcomputer configuring the control device 38 has, for example, the CPU (calculation device), and further, a memory 38D as a storage section composed of a ROM, a RAM and the like. A process program for executing a process flow shown in FIG. 4 to be described later, a first map, a second map and a calculation expression for estimating a trapping quantity of particulate matter in advance prepared, a regeneration start threshold value Hs and a regeneration end threshold value He in advance set, a relation between a pressure value of the EGR valve inlet side pressure sensor 22 and a pressure value of the filter inlet side pressure sensor 34 and the like are stored in the memory 38D.

Here, the first map estimates a trapping quantity based upon a differential pressure $\Delta Ph$ of the filter 30. Specifically, the first map in advance finds, for example, a corresponding relation between the differential pressure $\Delta Ph$, the flow quantity of the exhaust gas and the first estimated trapping quantity H1 by experiments, calculations, simulations and the like and is produced by forming the corresponding relation as a map. The flow quantity of the exhaust gas can be found based upon an engine rotational speed N and a fuel injection quantity F, for example. The differential pressure $\Delta h$ of the filter 30 is calculated according to the following Formula 1 in a case where a pressure (pressure value) in the inlet side detected by the filter inlet side pressure sensor 34 is indicated at P1 and a pressure (pressure value) in the outlet side detected by the filter outlet side pressure sensor 35 is indicated at P2.

$$\Delta Ph = P1 - P2 \qquad \text{[Formula 1]}$$

On the other hand, the second map finds an exhaust quantity Hm of particulate matter exhausted from the engine 13 based upon a rotational speed N of the engine 13 and a fuel injection quantity F. Specifically, the second map in advance finds a corresponding relation between the rotational speed N, the fuel injection quantity F and the exhaust quantity Hm of particulate matter by experiments, calculations, simulations and the like and is produced by forming the corresponding relation as a map. The calculation formula for estimating the trapping quantity can be expressed as the following Formula 2 in a case where a second estimated trapping quantity is indicated at H2, an integrated value of exhaust quantities of particulate matter found by the second map is indicated at Hm and an integrated value of quantities (regeneration quantities) of particulate matter removed from the filter 30 by regeneration treatment is indicated at J.

$$H2 = Hm - J \qquad \text{[Formula 2]}$$

In this case, the quantity of the particulate matter removed by the regeneration treatment, that is, the regeneration quantity J can be calculated from a relation of the flow quantity of the exhaust gas found from the engine rotational speed N and the fuel injection quantity F, the exhaust gas temperature and an NO2 conversion rate found by adding the exhaust gas temperature to the exhaust quantity of nitrogen oxides (NOx) found from the engine rotational speed N and the fuel injection quantity F.

The regeneration start threshold value Hs is a threshold value (regeneration start value) of the estimated trapping quantity H for determining whether to start the regeneration treatment (burning of the particulate matter by post injection) of the filter 30. That is, the regeneration start threshold value Hs is a determination value for determining the necessity of the regeneration when the first estimated trapping quantity H1 estimated by the above-mentioned first map and the second estimated trapping quantity H2 estimated by the above-mentioned second map and calculation formula are equal to or more than the regeneration start threshold value Hs. In other words, the regeneration start threshold value Hs is a determination value for determining whether or not the particulate matter trapped by the filter 30 reaches a trapping quantity necessary for the regeneration treatment of the filter 30. Therefore, a value of the regeneration start threshold value Hs is in advance set based upon experiments, calculations, simulations and the like in such a manner as to be capable of starting the regeneration treatment in an appropriate state, for example, in a state where a sufficient quantity of particulate matter is trapped in the filter 30.

The regeneration end threshold value He is a threshold value (regeneration end value) of the estimated trapping quantity H for determining whether to end the regeneration treatment of the filter 30. That is, the regeneration end threshold value He is a determination value for determining that the particulate matter in the filter 30 is sufficiently burned and removed when the first estimated trapping quantity H1 estimated by the above-mentioned first map, and/or the second estimated trapping quantity H2 estimated by the above-mentioned second map and calculation formula are equal to or less than the regeneration end threshold value He. In other words, the regeneration end threshold value He is a determination value for determining whether or not the quantity of the particulate matter in the filter 30 is reduced to a sufficiently low remaining quantity. Therefore, a value of the regeneration end threshold value He is in advance set based upon experiments, calculations, simulations and the like in such a manner as to be capable of ending the regeneration treatment in an appropriate state, for example, in a state where the quantity of the particulate matter in the filter 30 is reduced to a sufficiently low remaining quantity.

The control device 38 (more specifically, the regeneration controller 38C incorporated in the control device 38) performs control of automatic regeneration treatment of automatically performing the regeneration without being based upon an operation of an operator. In this case, the control device 38 performs the treatment (control) of the start and the end of the regeneration based upon the trapping quantity of the particulate matter trapped in the filter 30. That is, the control device 38 estimates the trapping quantity of the particulate matter trapped in the filter 30 (PM calculation section). The estimation of the trapping quantity can be made based upon at least a differential pressure $\Delta Ph$ in the filter 30, that is, a differential pressure ($\Delta Ph = P1 - P2$) as a difference between a filter inlet side pressure value (P1) detected by the filter inlet side pressure sensor 34 and a filter outlet side pressure value (P2) detected by the filter outlet side pressure sensor 35 (first trapping quantity estimating section). The trapping quantity estimated based upon this differential pressure ($\Delta Ph = P1 - P2$), that is, the trapping quantity estimated by the first trapping quantity estimating section is defined as a first estimated trapping quantity. The estimation of the trapping quantity can be made based upon at least an engine rotational speed N and a fuel injection quantity F (and an exhaust gas temperature as needed) (second trapping quantity estimating section). The trapping quantity estimated based upon the engine rotational speed N and the fuel injection quantity F, that is, the trapping quantity estimated by the second trapping quantity estimating section is defined as a second estimated trapping quantity.

The estimation of the trapping quantity can be made using anyone or both of the first trapping quantity estimating section and the second trapping quantity estimating section. In accordance with a driving state, an estimation means high in accuracy at that time may be used. Further, the trapping quantity of the particulate matter may be estimated using an estimating method, an estimating process, an estimating means and an estimating circuit other than the first trapping quantity estimating section and the second trapping quantity estimating section. In this embodiment, the control device 38 is provided with both of the first trapping quantity estimating section and the second trapping quantity estimating section.

The control device 38, when the estimated trapping quantity is defined as an estimated trapping quantity H, determines whether to start the regeneration of the filter 30 using the estimated trapping quantity H (regeneration start determining section). That is, the control device 38 makes a determination of starting the regeneration of the filter 30 when the estimated trapping quantity H, more specifically, at least any one of the first estimated trapping quantity H1 estimated by the first trapping quantity estimating section and the second estimated trapping quantity H2 estimated by the second trapping quantity estimating section is equal to or more than a preset trapping quantity threshold value (regeneration start threshold value Hs) (regeneration determining section). Next, the control device 38, for example, outputs a control signal of performing post injection to the fuel injection device 18 based upon the determination of the regeneration start (equal to or more than the regeneration start threshold value Hs) and starts the control of the automatic regeneration treatment for automatically performing the regeneration without through an operation of an operator.

On the other hand, the control device 38 determines whether to end the regeneration of the filter 30 using the estimated trapping quantity H (regeneration end determining section). For example, the control device 38 makes a determination of ending the regeneration of the filter 30 when the estimated trapping quantity H (at least any one of the first estimated trapping quantity H1 and the second estimated trapping quantity H2) is equal to or less than a preset trapping quantity threshold value (regeneration end threshold value He) (regeneration determining section). The control device 38, when the regeneration is determined to end (equal to or less than the regeneration end threshold value He), outputs a control signal of ending the post injection to the fuel injection device 18 and ends the control of the automatic regeneration process.

In this way, the control device 38 is provided with the first trapping quantity estimating section, the second trapping quantity estimating section and the regeneration determining section (regeneration start determining section, regeneration end determining section) for performing the regeneration of the filter 30, that is, for performing the determination of the start of the regeneration and the determination of the end of the regeneration, and the like. In addition, the control device 38 starts the process of the post injection in the fuel injection device 18 based upon the determination of the start of the regeneration and ends the process of the post injection in the fuel injection device 18 based upon the determination of the end of the regeneration.

In this embodiment, the regeneration of the filter 30 (that is, the burning of the particulate matter accumulated in the filter 30) is made by increasing the temperature of the exhaust gas by the post injection, but is not limited thereto. For example, the particulate matter accumulated in the filter 30 may be bunt by providing a heater to the exhaust gas purifying device 27 and heating a filter with this heater or the like. In addition, for example, the particulate matter accumulated in the filter 30 may be bunt by providing an exhaust throttle valve to an exhaust side and adjusting an opening degree of the exhaust throttle valve and an opening degree of the intake throttle valve 16.

Incidentally, when various sensors provided in the exhaust gas purifying device 27 are in trouble or in malfunction, the estimation of the trapping quantity of the particulate matter is possibly not made correctly. For example, when the filter inlet side pressure sensor 34 is in failure (for example, including break, short circuit, trouble, malfunction, drawback, abnormality and the like), the estimation of the trapping quantity of the particulate matter is possibly not made correctly. In this case, when the determination of the regeneration treatment continues to be made, even when the filter still has a sufficient allowance to the extent of the excess trap of the particulate matter, a process of forcibly prompting the regeneration treatment is possibly executed. In addition, it is considered that a fuel injection quantity is immediately limited by the failsafe control, following the failure of the filter inlet side pressure sensor 34. However, in this case, even in a case where an operator tries to drive the hydraulic excavator 1 from a working site to a maintenance site, the engine 13 is stopped (stalled), creating a possibility of being incapable of moving the hydraulic excavator 1.

Therefore, in this embodiment, the control device 38 (more specifically, the regeneration controller 38C incorporated in the control device 38) is provided with a failure determining section (step 3 and step 5 in FIG. 4) that determines whether or not the filter inlet side pressure sensor 34 is in failure based upon the difference between the pressure value of the filter inlet side pressure sensor 34 and the pressure value of the EGR valve inlet side pressure sensor 22. In addition, the control device 38 is provided with a sensor substitute section (step 8 in FIG. 4) using the EGR valve inlet side pressure sensor 22 instead of the filter inlet side pressure sensor 34 as the pressure sensor used in the regeneration device 31 when the failure is determined by the failure determining section. That is, the regeneration controller 38C makes a determination of the failure in the filter inlet side pressure sensor 34 based upon the difference between the pressure value detected by the filter inlet side pressure sensor 34 and the pressure value detected by the EGR valve inlet side pressure sensor 22. In addition, when the filter inlet side pressure sensor 34 is determined to be in failure, the regeneration controller 38C performs the control using the EGR valve inlet side pressure sensor 22 instead of the filter inlet side pressure sensor 34 as the pressure sensor used in the regeneration device 31. Specifically, when the filter inlet side pressure sensor 34 is determined to be in failure, the regeneration controller 38C performs the control of the regeneration treatment using the differential pressure calculated based upon the pressure value detected by the EGR valve inlet side pressure sensor 22 and the pressure value detected by the filter outlet side pressure sensor 35. In this case, in the first embodiment the failure determining section of the regeneration controller 38C makes the determination of the failure in the filter inlet side pressure sensor 34 when the engine 13 is driving (that is, all the time during the driving), for example. On the other hand, when the filter inlet side pressure sensor 34 is determined to be not in failure, the regeneration controller 38C performs the control of the regeneration treatment using the differential pressure calculated based upon the pressure value detected by the filter inlet side pressure sensor 34 and the pressure value detected by the filter outlet side pressure sensor 35.

Figure 4:
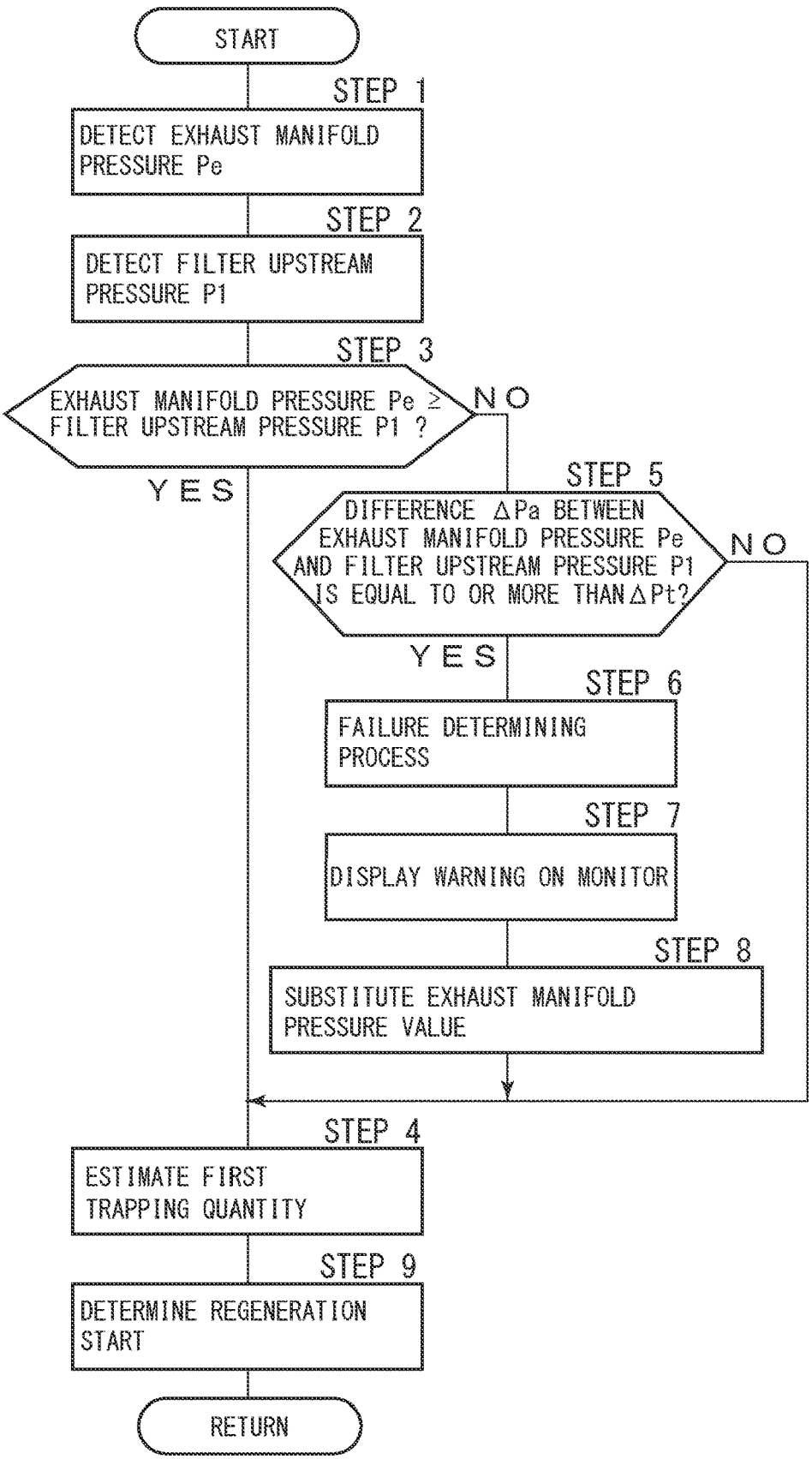
FIG. 4 is a flow chart showing a control content by the control device in FIG. 3.
Figure 5:
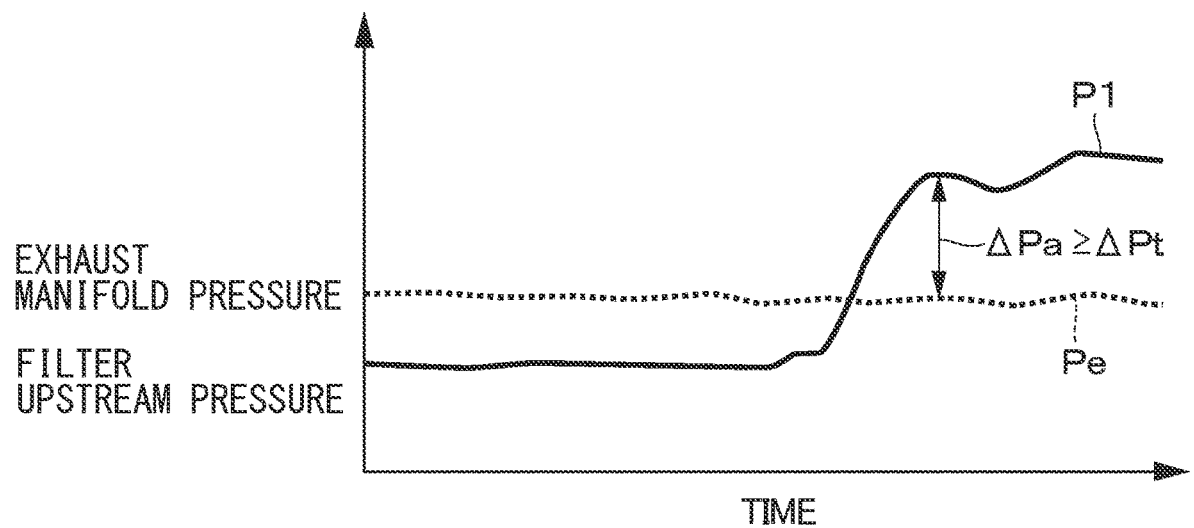
FIG. 5 is a characteristic line diagram showing an example of a change in exhaust manifold pressure and filter upstream pressure over time.

Here, the failure determining section of the regeneration controller 38C makes a determination that the filter inlet side pressure sensor 34 is in failure when a difference $\Delta Pa$ ($=P1-P2$) between a pressure value P1 detected by the filter inlet side pressure sensor 34 and a pressure value Pe detected by the EGR valve inlet side pressure sensor 22 is equal to or more than a preset failure determining threshold value $\Delta Pt$ ($\Delta Pa \geq \Delta Pt$) (step 5 in FIG. 4). Specifically, as shown in FIG. 5, when an upstream pressure value P1 as the pressure value of the filter inlet side pressure sensor 34 is larger by a failure determining threshold value $\Delta Pt$ or more than an exhaust manifold pressure value Pe as the pressure value of the EGR valve inlet side pressure sensor 22, the filter inlet side pressure sensor 34 is determined to be in failure. A value of the failure determining threshold value $\Delta Pt$ can be in advance set based upon experiments, calculations, simulations and the like such that the failure of the filter inlet side pressure sensor 34 can be determined with good accuracy from the difference $\Delta Pa$ between the filter upstream pressure value P1 and the exhaust manifold pressure value Pe.

On the other hand, when the filter inlet side pressure sensor 34 is determined to be in failure by the failure determining section, the sensor substitute section of the regeneration controller 38C uses the pressure value Pe of the EGR valve inlet side pressure sensor 22 instead of the filter inlet side pressure value P1 used in the first trapping quantity estimating section. That is, when the filter inlet side pressure sensor 34 is determined to be in failure, the regeneration controller 38C estimates the first trapping quantity estimating section H1 using the differential pressure calculated based upon the pressure value Pe detected by the EGR valve inlet side pressure sensor 22 and the pressure value P2 detected by the filter outlet side pressure sensor 35. More specifically, a relation (correlation) between the pressure value P1 detected by the filter inlet side pressure sensor 34 and the pressure value Pe detected by the EGR valve inlet side pressure sensor 22 when both of the filter inlet side pressure sensor 34 and the EGR valve inlet side pressure sensor 22 are normal, is stored in the memory 38D in the control device 38.

Here, the relation between the exhaust manifold pressure value Pe and the filter upstream pressure value P1 when the EGR valve inlet side pressure sensor 22 and the filter inlet side pressure sensor 34 are normal, is stored in the memory 38D as, for example, a map, a calculation expression, a matrix and the like. For example, the above relation can be stored as a map (differential pressure map) corresponding to a difference between the exhaust manifold pressure value Pe and the filter upstream pressure value P1 in the memory 38D. Values of the map, the calculation expression, the matrix and the like are in advance set based upon experiments, calculations, simulations and the like such that a pressure value P1' corresponding to the filter upstream pressure value P1 can be found from the exhaust manifold pressure value Pe with good accuracy.

When the filter inlet side pressure sensor 34 is determined to be in failure by the failure determining section, the sensor substitute section of the regeneration controller 38C calculates a pressure value P1' of the filter inlet side pressure sensor 34 from the pressure value Pe detected by the EGR valve inlet side pressure sensor 22 based upon the relation (map) of the pressure value P1 of the filter inlet side pressure sensor 34 and the pressure value Pe of the EGR valve inlet side pressure sensor 22 that are stored in the memory 38D, and uses the calculated pressure value P1' instead of the pressure value P1 of the filter inlet side pressure sensor 34. For example, a differential pressure corresponding to the exhaust manifold pressure value Pe is found from the differential pressure map, and by subtracting this differential pressure from the exhaust manifold pressure value Pe, the pressure value P1' corresponding to the pressure value P1 of the filter inlet side pressure sensor 34 is calculated. In addition, the regeneration controller 38C estimates (calculates) the first estimated trapping quantity H1 using the pressure value P1'. That is, the regeneration controller 38C estimates (calculates) the first estimated trapping quantity H1 using the differential pressure ($\Delta$Ph'=P1'−P2) calculated based upon the calculated pressure value P1' and the pressure value P2 detected by the filter outlet side pressure sensor 35. In addition, the control of the regeneration treatment, that is, the determination on whether to perform the regeneration treatment (determination on a start of the regeneration treatment) is performed using the estimated first estimated trapping quantity H1. It should be noted that descriptions on the control process (processes shown in FIG. 4) to be executed in the control device 38 (more specifically, the regeneration controller 38C) will be in detail made later.

The hydraulic excavator 1 according to the first embodiment has the configuration as described above, and, next, an operation thereof will be explained.

The compact hydraulic excavator 1 a machine weight of which is approximately 0.7 to 8 tons is transported to the working site in a state of being loaded on a loading platform of a truck. When the hydraulic excavator 1 is transported to the working site, an operator of the hydraulic excavator 1 gets on the cab 9 of the upper revolving structure 5, and starts the engine 13 to drive the hydraulic pump 24. Thereby, the pressurized oil from the hydraulic pump 24 is delivered through the control valve device to various actuators including the swing cylinder 6E, the boom cylinder 6F, the arm cylinder 6G and the bucket cylinder 6H. When the operator having got on the cab 9 operates an operating lever for traveling, the lower traveling structure 2 can go forward or backward.

On the other hand, when the operator in the cab 9 operates an operating lever for working, the front device 6 can be tilted and lifted to perform an excavating work of sand and earth or the like. In this case, since a revolving radius by the upper revolving structure 5 is small, the compact hydraulic excavator 1 can perform an excavating work such as a side ditch digging work while revolving and driving the upper revolving structure 5 even in a narrow working site such as an urban area.

At the operating of the engine 13, the particulate matter that is harmful substances is exhausted from the exhaust pipe 17. At this time, the exhaust gas purifying device 27 can oxidize and remove hydrocarbons (HC), nitrogen oxides (NOx), and carbon monoxides (CO) in an exhaust gas by the oxidation catalyst 29. The filter 30 traps the particulate matter contained in the exhaust gas. Thereby, the purified exhaust gas can be exhausted through the downstream exhaust port 28A to an outside. Further, the particulate matter trapped in the filter 30 is burned and removed by the regeneration device 31 to regenerate the filter 30.

Next, an explanation will be made of the control process to be executed by the control device 38 (more specifically, the regeneration controller 38C) with reference to the flow chart in FIG. 4. It should be noted that the processes in FIG. 4 are repeatedly executed for each predetermined control time (in a predetermined sampling frequency) by the control device 38 while power is supplied to the control device 38, for example.

The control device 38 is activated by power supply to the accessories or by the start of the engine 13. When the process operation in FIG. 4 starts by this activation, in step 1 an exhaust manifold pressure is detected. That is, a detection value (exhaust manifold pressure value Pe) of the EGR valve inlet side pressure sensor 22 reads in. In step 2 a filter upstream pressure is detected. That is, a detection value (filter upstream pressure value P1) of the filter inlet side pressure sensor 34 reads in. In step 3 it is determined whether or not the exhaust manifold pressure value Pe is equal to or more than the filter upstream pressure value P1.

In a case where "YES" is determined in step 3, that is, the exhaust manifold pressure value Pe is equal to or more than the filter upstream pressure value P1 (Pe≥P1), the process goes to step 4. In step 4, the first estimated trapping quantity H1 is estimated. In this case, that is, in a case where "YES" is determined in step 3 and the process goes to step 4, it is considered that the filter inlet side pressure sensor 34 is normal. Therefore, in this case the first estimated trapping quantity H1 is estimated based upon the detection value (filter upstream pressure value P1) of the filter inlet side pressure sensor 34 detected in step 2. That is, when it is determined that the filter inlet side pressure sensor 34 is not in failure, the first estimated trapping quantity H1 is estimated using the differential pressure ($\Delta$Ph=P1−P2) calculated based upon the pressure value P1 detected by the filter inlet side pressure sensor 34 and the pressure value P2 detected by the filter outlet side pressure sensor 35. When the first estimated trapping quantity H1 is estimated in step 4, the process goes to step 9. In step 9, the control of the regeneration treatment, specifically the determination of the regeneration start is made. For example, it is determined whether or not the first estimated trapping quantity H1 estimated in step 4 is equal to or more than the preset regeneration start threshold value Hs. When the first estimated trapping quantity H1 is determined to be equal to or more than the preset regeneration start threshold value Hs, the regeneration treatment is performed and then, the process goes to Return. That is, in this case, the regeneration treatment of the filter 30 is performed, for example, by starting the post injection in the fuel injection device 18 to increase the temperature of the exhaust gas and burn the particulate matter accumulated in the filter 30. On the other hand, when the first estimated trapping quantity H1 is less than the regeneration start threshold value Hs, the process goes to Return without performing the regeneration treatment. In step 9, it is possible to make the determination of the regeneration start using not only the first estimated trapping quantity H1 estimated in step 4 but also the second estimated trapping quantity H2. In any case, in step 9 when the determination of the regeneration start is made and the regeneration treatment is performed as needed, the process goes through Return to Start, and processes after step 1 are repeated.

On the other hand, in a case where "NO" is determined in step 3, that is, in a case where the exhaust manifold pressure value Pe is not equal to or more than the filter upstream pressure value P1 (the filter upstream pressure value P1 is larger than the exhaust manifold pressure value Pe, P1>Pe), the process goes to step 5. In step 5, it is determined whether or not a difference ΔPa (=P1−Pe) between the exhaust manifold pressure value Pe and the filter upstream pressure value P1 is equal to or more than failure determining threshold value ΔP. That is, in step 5, it is determined whether or not the difference ΔPa between the pressure value P1 detected by the filter inlet side pressure sensor 34 and the pressure value Pe detected by the EGR valve inlet side pressure sensor 22 is equal to or more than the preset failure determining threshold value ΔPt.

In a case where in step 5 "NO" is determined, that is, in a case where it is determined that the difference ΔPa between the exhaust manifold pressure value Pe and the filter upstream pressure value P1 is not more than the failure determining threshold value ΔPt (ΔPa<ΔPt), the process goes to step 4. Also in this case, it is considered that the filter inlet side pressure sensor 34 is normal (in a range of being normal). Therefore, also in this case, in step 4, the first estimated trapping quantity H1 is estimated based upon the detection value (filter upstream pressure value P1) of the filter inlet side pressure sensor 34 detected in step 2. That is, the first estimated trapping quantity H1 is estimated using the differential pressure (ΔPh=P1−P2) calculated based upon the pressure value P1 detected by the filter inlet side pressure sensor 34 and the pressure value P2 detected by the filter outlet side pressure sensor 35. In subsequent step 9, the determination of the regeneration start is made, and the regeneration treatment is performed as needed and then, the process goes to Return.

On the other hand, in a case where in step 5 "YES" is determined, that is, in a case where it is determined that the difference ΔPa between the exhaust manifold pressure value Pe and the filter upstream pressure value P1 is equal to or more than the failure determining threshold value ΔPt (ΔPa≥ΔPt), the process goes to step 6. In this case, it is considered that the filter inlet side pressure sensor 34 is in failure. Therefore, in step 6, it is determined that the filter inlet side pressure sensor 34 is in failure. In subsequent step 7, a warning is displayed on a monitor as the notification device 37. That is, an event that the filter inlet side pressure sensor 34 is in failure is displayed on a display screen (monitor) of the notification device 37, and this event is notified to an operator. In this case, since in step 8, the filter upstream pressure value P1 is substituted by the exhaust manifold pressure value Pe, control of limiting the operation (for example, failure safe control of immediately limiting the fuel injection quantity) is not performed.

In subsequent step 8, the exhaust manifold pressure value Pe is used as a substitute. That is, in step 8, the EGR valve inlet side pressure sensor 22 is used in place of the filter inlet side pressure sensor 34 as a pressure sensor used in the regeneration device 31. In this case, the control device 38 calculates a pressure value P1' of the filter inlet side pressure sensor 34 from the pressure value Pe of the EGR valve inlet side pressure sensor 22 based upon the relation of the pressure value Pe of the EGR valve inlet side pressure sensor 22 and the pressure value P1 of the filter inlet side pressure sensor 34 that are in advance stored in the memory 38D.

In step 8, when the pressure value P1' is calculated, the process goes to step 4. In this case, that is, in a case where the process goes from step 8 to step 4, the filter inlet side pressure sensor 34 is in failure. Therefore, in this case the first estimated trapping quantity H1 is estimated based upon the pressure value P1' calculated in step 8. That is, when it is determined that the filter inlet side pressure sensor 34 is in failure, the first estimated trapping quantity H1 is estimated using the pressure value (ΔPh'=P1'−P2) calculated based upon the pressure value Pe of the EGR valve inlet side pressure sensor 22 (more specifically, the pressure value P1' calculated from the relation of the pressure value Pe and the pressure value P1) and the pressure value P2 detected by the filter outlet side pressure sensor 35. In subsequent step 9, the determination of the regeneration start is made and the regeneration treatment is performed as needed, and the process goes to Return.

FIG. 5 shows an example of a change in exhaust manifold pressure value Pe and filter upstream pressure value P1 over time. When the EGR valve inlet side pressure sensor 22 and the filter inlet side pressure sensor 34 are normal, the filter upstream pressure value P1 is smaller than the exhaust manifold pressure value Pe. When the filter inlet side pressure sensor 34 becomes in failure over time, the filter upstream pressure value P1 increases. At this time, when the difference ΔPa between the filter upstream pressure value P1 and the exhaust manifold pressure value Pe is equal to or more than the failure determining threshold value ΔPt, in step 5 in FIG. 4, "YES" is determined. Consequently, by the process in step 7, an event that the filter inlet side pressure sensor 34 is in failure is displayed on the monitor of the notification device 37. As a result of the process in step 8, the pressure value P1 of the filter inlet side pressure sensor 34 is substituted by the pressure value Pe of the EGR valve inlet side pressure sensor 22. That is, in step 4, the first estimated trapping quantity H1 is estimated (calculated) based upon the exhaust manifold pressure value Pe.

As described above, according to the first embodiment, when in step 3 and step 5 as the failure determining section, it is determined that the filter inlet side pressure sensor 34 is in failure, the control device 38 (more specifically, the regeneration controller 38C incorporated in the control device 38) uses the EGR valve inlet side pressure sensor 22 in place of the filter inlet side pressure sensor 34 as the pressure sensor used in the regeneration device 31 by step 8 (and step 4 subsequent to step 8) as the sensor substitute section. That is, the control device 38 (the regeneration controller 38C) executes the control of the regeneration treatment using the pressure difference ΔPh' calculated based upon the pressure value Pe detected by the EGR valve inlet side pressure sensor 22 and the pressure value P2 detected by the filter outlet side pressure sensor 35. Therefore, it is possible to continue the operation by making up for the failure of the filter inlet side pressure sensor 34 with the EGR valve inlet side pressure sensor 22. Consequently, even when the filter inlet side pressure sensor 34 is in failure, it is possible for an operator to continue the work by the hydraulic excavator 1.

According to the first embodiment, the control device 38 (regeneration controller 38C) makes a determination on whether or not the filter inlet side pressure sensor 34 is in failure when the engine 13 is driving. Therefore, even in a case where the filter inlet side pressure sensor 34 is in failure when the engine 13 is driving, the control device 38 (regeneration controller 38C) uses the EGR valve inlet side pressure sensor 22 in place of the filter inlet side pressure sensor 34, thus making it possible to continue the drive of the engine 13. Consequently, it is possible to continue the work by the hydraulic excavator 1.

According to the first embodiment, the control device 38 (regeneration controller 38C) determines that the filter inlet side pressure sensor 34 is in failure when the difference $\Delta Pa$ between the pressure value P1 detected by the filter inlet side pressure sensor 34 and the pressure value Pe detected by the EGR valve inlet side pressure sensor 22 is equal to or more than the preset failure determining threshold value $\Delta Pt$ by the process in step 5. Therefore, the failure of the filter inlet side pressure sensor 34 can be determined with good accuracy based upon two pressure values composed of the pressure value P1 of the filter inlet side pressure sensor 34 and the pressure value Pe of the EGR valve inlet side pressure sensor 22.

According to the first embodiment, the control device 38 (regeneration controller 38C) is provided with the first trapping quantity estimating section (step 4) that estimates (calculates) the first estimated trapping quantity H1, the second trapping quantity estimating section that estimates (calculates) the second estimated trapping quantity H2, further the regeneration determining section that determines the start and end of the regeneration treatment from the first estimated trapping quantity H1 and the second estimated trapping quantity H2. When the filter inlet side pressure sensor 34 is determined to be in failure by step 3 and step 5, the control device 38 (regeneration controller 38C) estimates the first estimated trapping quantity H1 to be estimated in step 4 using the pressure value Pe of the EGR valve inlet side pressure sensor 22 instead of the filter inlet side pressure value P1. That is, the first estimated trapping quantity H1 is estimated using the differential pressure $\Delta Ph'$ calculated based upon the pressure value Pe detected by the EGR valve inlet side pressure sensor 22 and the pressure value P2 detected by the filter outlet side pressure sensor 35. Consequently, even when the filter inlet side pressure sensor 34 is in failure, it is possible to continue the estimation (calculation of the first estimated trapping quantity H1) of the first trapping quantity based upon the pressure value Pe of the EGR valve inlet side pressure sensor 22. Therefore, even when the filter inlet side pressure sensor 34 is in failure, the regeneration treatment can be appropriately performed, and the work by the hydraulic excavator 1 can continue to be performed.

According to the first embodiment, the relation (map showing the relation) between the pressure value P1 detected by the filter inlet side pressure sensor 34 and the pressure value Pe detected by the EGR valve inlet side pressure sensor 22 when both of the filter inlet side pressure sensor 34 and the EGR valve inlet side pressure sensor 22 are normal, is stored in the memory 38D in the control device 38 (regeneration controller 38C). When the filter inlet side pressure sensor 34 is determined to be in failure by step 3 and step 5, the control device 38 (regeneration controller 38C) calculates a pressure value P1' of the filter inlet side pressure sensor 34 from the pressure value Pe detected by the EGR valve inlet side pressure sensor 22, based upon the relation (map) of the pressure value Pe of the EGR valve inlet side pressure sensor 22 and the pressure value P1 of the filter inlet side pressure sensor 34 that are stored in the memory 38D. In addition, the control device 38 (the regeneration controller 38C) uses the calculated pressure value P1' instead of the pressure value P1 of the filter inlet side pressure sensor 34. That is, the control of the regeneration treatment (estimation of the first estimated trapping quantity H1) is performed using the differential pressure ($\Delta Ph'=P1'-P2$) calculated based upon the calculated pressure value P1' calculated from a relation of the pressure value Pe and the pressure value P1 and the pressure value P2 detected by the filter outlet side pressure sensor 35. Therefore, the substitute value P1' calculated from the pressure value Pe of the EGR valve inlet side pressure sensor 22 can be found as a pressure of the filter inlet side with good accuracy.

Figure 6:
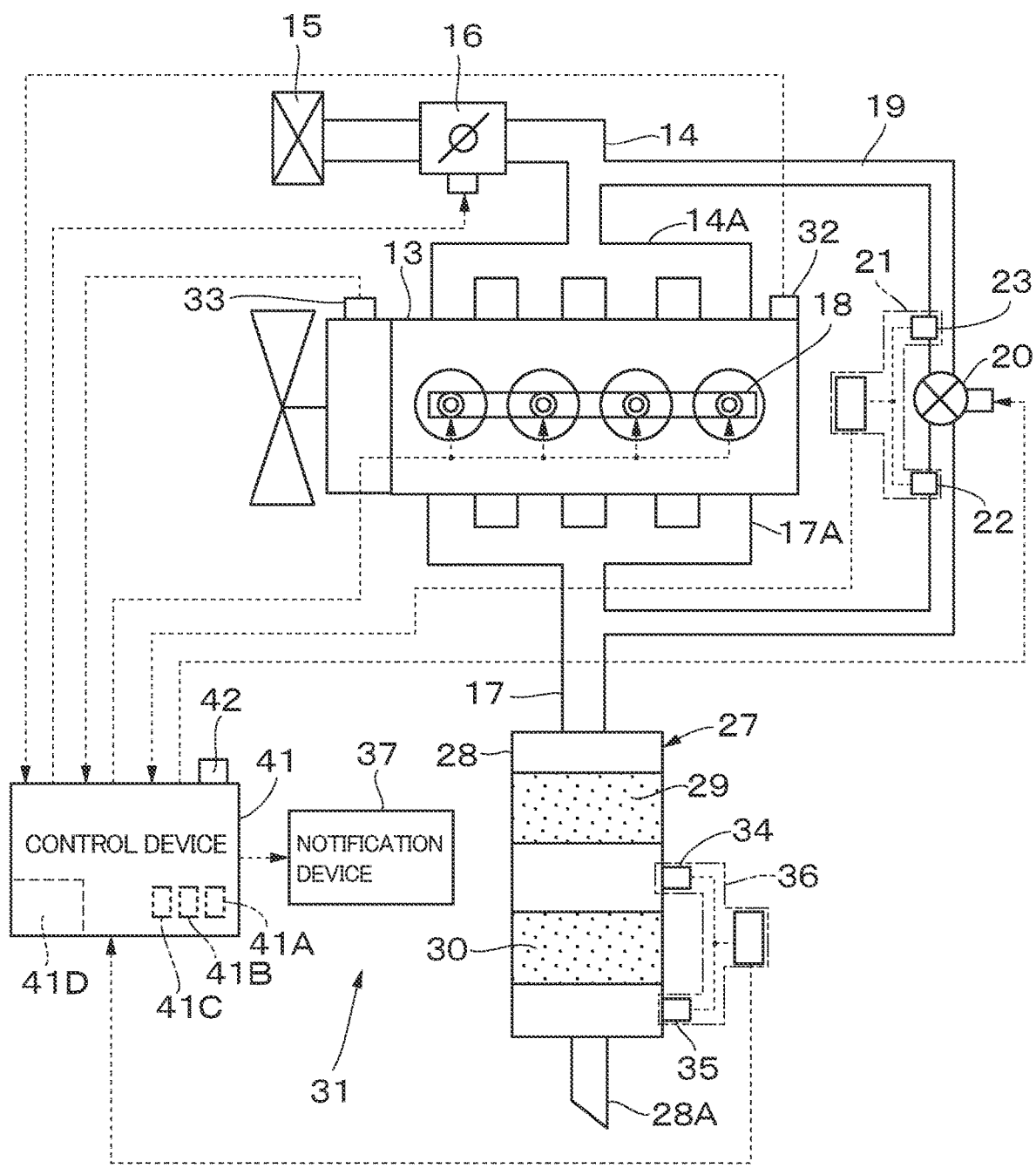
FIG. 6 is a configuration diagram showing an engine, an exhaust gas purifying device, a regeneration device, a control device and the like according to a second embodiment.
Figure 7:
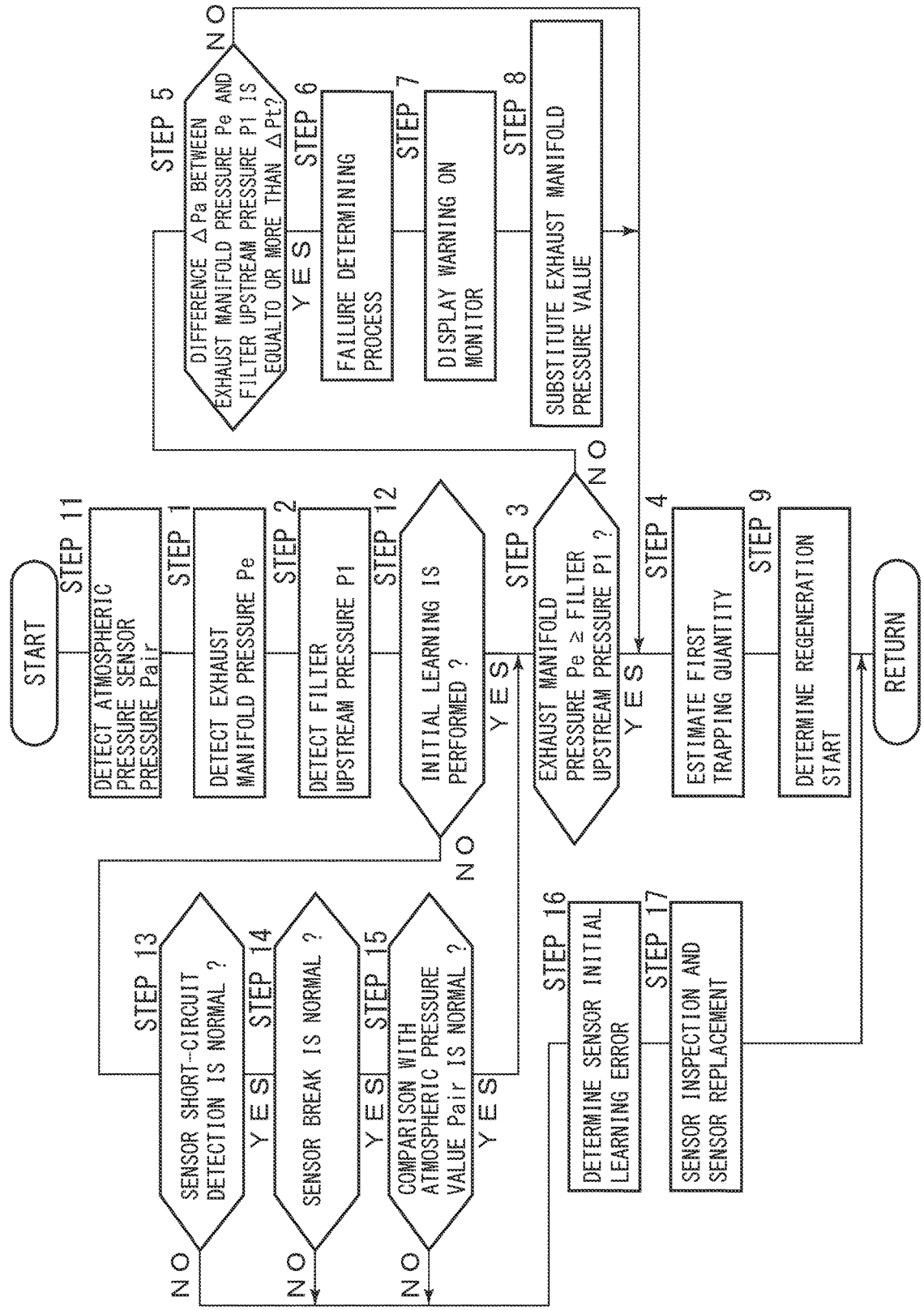
FIG. 7 is a flow chart showing a control content by the control device in FIG. 6.
Figure 8:
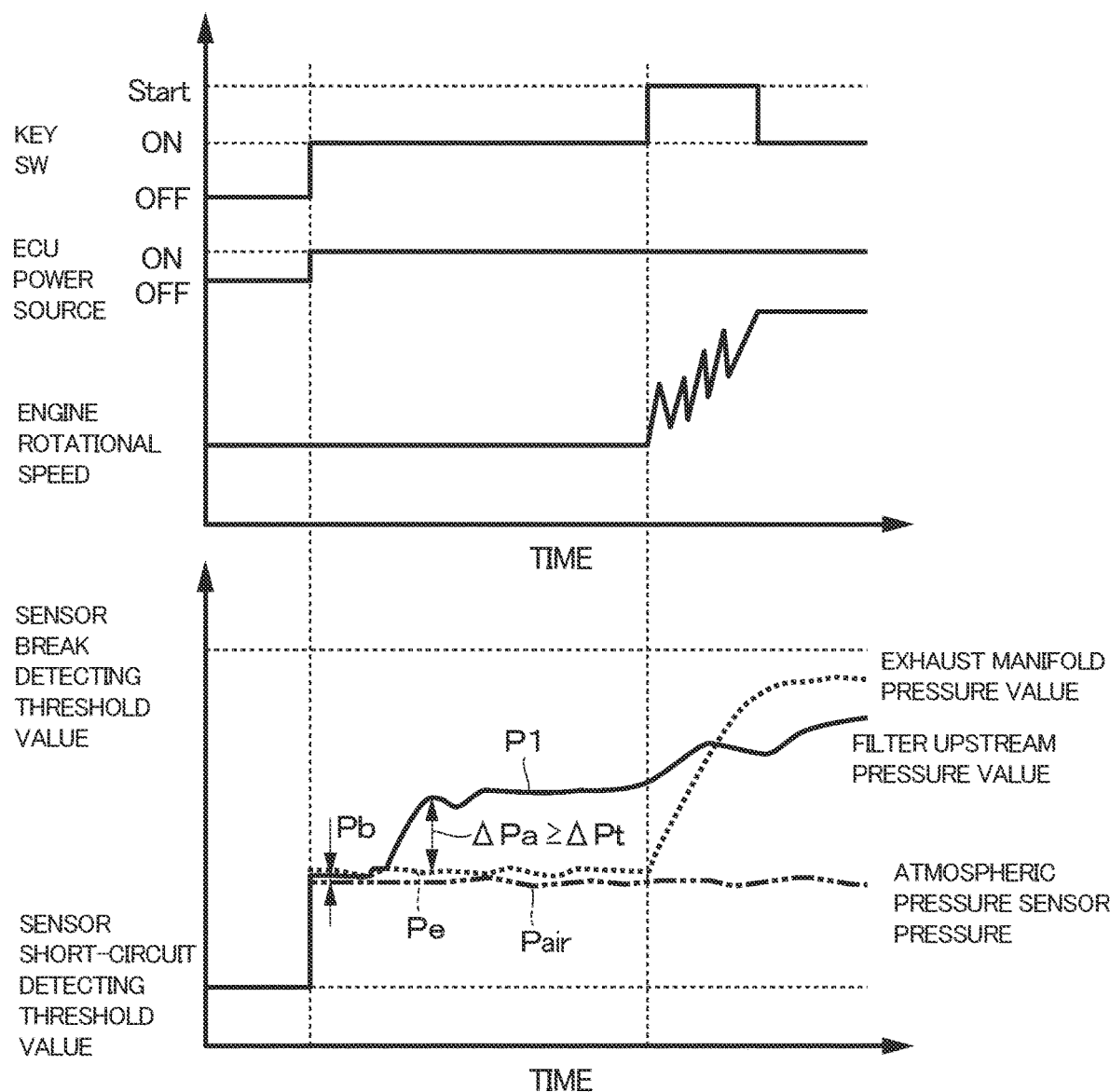
FIG. 8 is a characteristic line diagram showing an example of a change in key switch, ECU power source, engine rotational speed, atmospheric pressure sensor pressure, exhaust manifold pressure and filter upstream pressure over time.

Next, FIG. 6 to FIG. 8 show a second embodiment. The second embodiment is characterized in that it is determined whether or not a filter inlet side pressure sensor is in failure based upon a pressure value detected by an atmospheric pressure sensor and a pressure value detected by a filter inlet side pressure sensor before starting an engine. It should be noted that in the second embodiment, components identical to those in the aforementioned first embodiment are referred to as identical reference numerals and the explanation is omitted.

In the second embodiment, an atmospheric pressure sensor 42 is provided to be connected to a control device 41 in which a regeneration controller 41C is incorporated. That is, the atmospheric pressure sensor 42 that detects an atmospheric pressure is connected to the control device 41. In this case, the atmospheric pressure sensor 42 may be provided to be integral with the control device 41 or in the inside of the control device 41.

The control device 41 is substantially similar to the control device 38 in the first embodiment. That is, the control device 41, as similar to the control device 38 in the first embodiment, incorporates therein a function of an engine controller 41A, a function of an EGR controller 41B and a function of a regeneration controller 41C. The control device 41 has a memory 41D, and a process program for executing a process flow shown in FIG. 7, a first map, a second map, a calculation expression, a regeneration start threshold value Hs, a regeneration end threshold value He, a relation of a pressure value of an EGR valve inlet side pressure sensor 22 and a pressure value of a filter inlet side pressure sensor 34, a sensor break detecting threshold value, a sensor short-circuit detecting threshold value, an atmospheric pressure threshold value $\Delta Ps$ and the like are stored in the memory 41D.

In this case, the control device 41 (more specifically, the regeneration controller 41C) in the second embodiment is provided with, as similar to the control device 38, a failure determining section (step 3 and step 5 in FIG. 7) and a sensor substitute section (step 8 in FIG. 7), and further, a pre-start failure determining section (steps 13, 14, 15 in FIG. 7). The pre-start failure determining section of the regeneration controller 41C determines whether or not a filter inlet side pressure sensor 34 is in failure based upon a difference between a pressure value Pair detected by the atmospheric pressure sensor 42 and a pressure value P1 detected by the filter inlet side pressure sensor 34 before start of an engine 13, that is, during a period from system activation (key-ON, power source-ON) until the engine 13 starts to rotate.

Specifically, the pre-start failure determining section of the regeneration controller 41C determines whether or not the filter inlet side pressure sensor 34 is in failure based upon an offset quantity as a difference ΔPb (=P1−Pair) between the pressure value P1 detected by the filter inlet side pressure sensor 34 and the pressure value Pair detected by the atmospheric pressure sensor 42. That is, the pressure value P1 detected by the filter inlet side pressure sensor 34 and the pressure value Pair detected by the atmospheric pressure sensor 42 are approximately the same value before the start of the engine 13. Therefore, the pre-start failure determining section of the regeneration controller 41C determines that the filter inlet side pressure sensor 34 is in failure when the difference ΔPb between the pressure value P1 and the pressure value Pair is equal to or more than a preset pre-start failure determining threshold value ΔPs (ΔPb≥ΔPs).

In the second embodiment, even when it is determined that the filter inlet side pressure sensor 34 is not in failure by the pre-start failure determining section, the control device 41 makes a determination on whether or not the filter inlet side pressure sensor 34 is in failure by the failure determining section. That is, even when it is determined that the filter inlet side pressure sensor 34 is not in failure by the determination of the failure before the start of the engine 13, the regeneration controller 41C determines whether or not the filter inlet side pressure sensor 34 is in failure based upon the difference between the pressure value detected by the filter inlet side pressure sensor 34 and the pressure value detected by the EGR valve inlet side pressure sensor 22. It should be noted that a value of the pre-start failure determining threshold value ΔPs can be in advance set based upon experiments, calculations, simulations and the like such that the failure of the filter inlet side pressure sensor 34 can be determined with good accuracy from the difference ΔPb between the pressure value P1 of the filter inlet side pressure sensor 34 and the pressure value Pair of the atmospheric pressure sensor 42.

Next, an explanation will be made of processes to be executed by the control device 41 (more specifically, the regeneration controller 41C) with reference to the flow chart in FIG. 7. It should be noted that in the flow chart in FIG. 7 processes identical to those in the flow chart in FIG. 4 of the aforementioned first embodiment are referred to as identical step numbers. That is, processes in steps 1 to 9 in FIG. 7 are the processes identical to those in steps 1 to 9 in FIG. 4.

The control device 41 is activated by turning on a key switch (key-on) provided in an operator's seat, that is, by power supply to accessories before starting the engine 13. When the process operation in FIG. 7 starts with this activation, in step 11 an atmospheric pressure sensor pressure value Pair is detected. That is, a detection value (atmospheric pressure Pair) of the atmospheric pressure sensor 42 reads in.

In step 12 subsequent to step 2, it is determined whether or not the initial learning is already done. That is, it is determined whether or not processes of steps 13, 14, 15 are already executed after the processes in FIG. 7 are started by turning on the key. The initial learning is done once for each of turning on the key. In a case where "YES" is determined in step 12, that is, in a case where it is determined that the initial learning is already made, the process goes to step 3. In a case where "NO" is determined in step 12, that is, in a case where it is determined that the initial learning is not made yet, the process goes to step 13.

In step 13 detection of the sensor short-circuit (determination of presence/absence of abnormality on sensor short-circuit) is performed. That is, the detection of the sensor short-circuit in the filter inlet side pressure sensor 34 (and the EGR valve inlet side pressure sensor 22 as needed) is performed. Specifically, it is determined whether or not a detection value (pressure value) of the filter inlet side pressure sensor 34 (and the EGR valve inlet side pressure sensor 22 as needed) goes under a sensor short-circuit detection threshold value in FIG. 8. The sensor short-circuit detection threshold value can be in advance set based upon experiments, calculations, simulations and the like in such a manner as to be capable of detecting the sensor short-circuit with good accuracy.

In a case where "YES" is determined in step 13, that is, in a case where abnormality of the sensor short-circuit is determined to be not present, the process goes to step 14. In step 14 detection of the sensor break (that is, determination of presence/absence of abnormality of the sensor break) is performed. That is, detection of the sensor break in the filter inlet side pressure sensor 34 (and the EGR valve inlet side pressure sensor 22 as needed) is performed. Specifically, it is determined whether or not a detection value (pressure value) of the filter inlet side pressure sensor 34 (and the EGR valve inlet side pressure sensor 22 as needed) goes beyond a sensor break detection threshold value in FIG. 8. The sensor break detection threshold value can be in advance set based upon experiments, calculations, simulations and the like in such a manner as to be capable of detecting the sensor short-circuit with good accuracy.

In a case where "YES" is determined in step 14, that is, in a case where it is determined that there is not abnormality of the sensor break, the process goes to step 15. In step 15, based upon a comparison between a pressure value of the filter inlet side pressure sensor 34 (filter inlet side pressure value P1) and a detection value of the atmospheric pressure sensor 42 (atmospheric pressure Pair), presence/absence of abnormality of the filter inlet side pressure sensor 34 is determined. More specifically, when a difference ΔPs (=P1−Pair) between the pressure value P1 of the filter inlet side pressure sensor 34 and the pressure value Pair of the atmospheric pressure sensor 42 is equal to or more than a preset pre-start failure determining threshold value ΔPs (ΔPb≥ΔPs), it is determined that the pressure value of the filter inlet side pressure sensor 34 is abnormal.

In a case where "YES" is determined in step 15, that is, in a case where it is determined that the pressure value is not abnormal, the process goes to step 3. On the other hand, in a case where "NO" is determined in steps 13, 14, 15, that is, in a case where it is determined that abnormality of the short-circuit is present, abnormality of the break is present and abnormality of the pressure value is present, the process goes to step 16. In this case, it is considered that the filter inlet side pressure sensor 34 is in failure (abnormality of the short-circuit, abnormality of the break or abnormality of the pressure value is present). Therefore, in step 16 it is determined that the initial learning of the filter inlet side pressure sensor 34 is abnormal. In subsequent step 17, an operator is prompted to perform sensor inspection, and sensor replacement. For example, an event that the initial learning of the filter inlet side pressure sensor 34 is abnormal is displayed on the monitor as the notification device 37. In addition, the process ends through Return. In this case, for example, the engine 13 is configured to be incapable of starting until the sensor inspection or sensor replacement is performed or it is possible to execute a failsafe process, such as a process of limiting output of the engine 13.

FIG. 8 shows an example of a change in key switch (key SW), ECU power source (power source of the control device 38), engine rotational speed, atmospheric pressure sensor pressure value Pair, exhaust manifold pressure value Pe and filter upstream pressure value P1 over time. When the key switch is on and power is supplied to the control device 41, detections by the atmospheric pressure sensor 42, the EGR valve inlet side pressure sensor 22 and the filter inlet side pressure sensor 34 are started. At this time, the process of the initial learning by step 13 to step 15 in FIG. 7 is executed. This initial learning is made in a first control cycle at the time the key switch is on, for example.

In a case of a characteristic line diagram in FIG. 8, since the pressure value of the filter inlet side pressure sensor 34 (filter inlet side pressure value P1) and the detection value (atmospheric pressure Pair) of the atmospheric pressure sensor 42 are approximately the same, it is determined that the filter inlet side pressure sensor 34 is not abnormal. However, when the filter inlet side pressure sensor 34 is in failure thereafter, the filter upstream pressure value P1 increases. At this time, when the difference ΔPa between the filter upstream pressure value P1 and the exhaust manifold pressure value Pe is equal to or more than the failure determining threshold value ΔPt, in step 5, "YES" is determined. Consequently, by the process in step 7, an event that the filter inlet side pressure sensor 34 is in failure is displayed on the monitor as the notification device 37, and by the process in step 8, the pressure value P1 of the filter inlet side pressure sensor 34 is substituted by the pressure value Pe of the EGR valve inlet side pressure sensor 22. In this case, when the engine 13 starts, in step 4, the first estimated trapping quantity H1 is estimated (calculated) based upon the exhaust manifold pressure value Pe. That is, although a specific process thereof is omitted, when "YES" is determined in step 5, the exhaust manifold pressure value Pe continues to be used as the substitute thereafter. Therefore, it is possible to perform (continue) the start, operation and work of the hydraulic excavator 1.

The second embodiment continues to make the determination that the filter inlet side pressure sensor 34 is in failure even when it is determined that the filter inlet side pressure sensor 34 is not abnormal in the initial learning as described above, and a basic operation thereof is not particularly different from the aforementioned first embodiment.

Particularly, according to the second embodiment, the atmospheric pressure sensor 42 that detects an atmospheric pressure is connected to the control device 41 (regeneration controller 41C). The control device 41 (regeneration controller 41C) determines whether or not the filter inlet side pressure sensor 34 is in failure based upon the pressure value Pair detected by the atmospheric pressure sensor 42 and the pressure value P1 detected by the filter inlet side pressure sensor 34 before starting the engine 13 (step 15 in FIG. 7). In this case, even when the filter inlet side pressure sensor 34 is not in failure by the process in step 15 in FIG. 7 as the pre-start failure determining section, the control device 41 (regeneration controller 41C) determines whether or not the filter inlet side pressure sensor 34 is in failure (step 3 and step 5). Therefore, even when the filter inlet side pressure sensor 34 is not in failure by the process in step 15 before starting the engine 13, the control device 41 (regeneration controller 41C) can determine that the filter inlet side pressure sensor 34 is in failure by step 3 and step 5. Consequently, it is possible to make the determination on whether or not the filter inlet side pressure sensor 34 is in failure with good accuracy regardless of after and before the start of the engine 13.

It should be noted that the aforementioned embodiments are explained by taking a case where each of the control devices 38, 41 corresponds to each of the engine controllers 38A, 41A, each of the EGR controllers 38B, 41B and each of the regeneration controllers 38C, 41C, as an example. However, the present invention is not limited thereto, but, for example, an engine controller, an EGR controller and a regeneration controller each may be configured by a different controller. In addition, an engine controller and an EGR controller may be configured integrally, and a regeneration controller may be provided to be separated from the integrated controller. That is, whether an engine controller, an EGR controller and a regeneration controller are provided integrally or separately can be modified as needed depending upon a specification or the like of the hydraulic excavator 1 or the like.

The aforementioned embodiments are explained by taking a case where the regeneration of the filter 30 (that is, burning of the particulate matter accumulated in the filter 30) is performed by the post injection, as an example. However, the present invention is not limited thereto, but the regeneration of a filter may be performed, for example, by providing a heater to an exhaust gas purifying device and heating the filter with this heater. In addition, the regeneration of a filter may be performed, for example, by providing an exhaust throttle valve to the exhaust side of an engine and an intake throttle valve to the intake side of the engine, and adjusting an opening degree of the exhaust throttle valve and an opening degree of the intake throttle valve. That is, the configuration of performing the regeneration may include various kinds of configurations of being capable of burning the particulate matter accumulated in the filter.

The aforementioned embodiments are explained by taking a case where the second estimated trapping quantity H2 is estimated based upon the engine rotational speed N, the fuel injection quantity F and the exhaust gas temperature, as an example. However, the present invention is not limited thereto, but, for example, the second estimated trapping quantity H2 may be configured to be estimated by not only an engine rotational speed, a fuel injection quantity and an exhaust gas temperature but also a temperature of each component of a filter and the like, a state quantity of an engine load or the like (a state quantity representative of an operating state) and the like. In addition, in the embodiment, both of the first estimated trapping quantity H1 and the second estimated trapping quantity H2 are used for the control of the regeneration treatment, but, for example, the first estimated trapping quantity H1 only may be used without using the second estimated trapping quantity H2.

The aforementioned embodiments are explained by taking a case where the exhaust gas purifying device 27 is configured of the oxidation catalyst 29 and the filter 30, as an example. However, the present invention is not limited thereto, but the exhaust gas purifying device 27 may be configured, for example, using an oxidation catalyst and a particulate matter removing filter, and further, in combination with a urea injection valve, a selective reduction catalyst device and the like.

The aforementioned embodiments are explained by taking the hydraulic excavator 1 provided with the cab 9 surrounding the operator's seat 10 as an example. However, the present invention is not limited thereto, but may be applied also to a hydraulic excavator provided with a canopy covering an operator's seat from above.

The aforementioned embodiments are explained by taking the hydraulic excavator 1 provided with the front device 6 of a swing type capable of swinging in the left-right direction as an example. However, the present invention is not limited thereto, but may be applied also to a hydraulic excavator of any other type, such as a hydraulic excavator provided with a front device of a mono-boom type, a hydraulic excavator provided with a front device of an offset type or the like.

The aforementioned embodiments are explained by taking the compact hydraulic excavator 1 as an example, but the present invention may be applied to a medium-sized or larger hydraulic excavator, for example. The aforementioned embodiments are explained by taking the hydraulic excavator 1 provided with the bucket 6D as a working tool of the front device 6, as an example, but the present invention may be applied widely to various construction machines such as a demolish machine (demolish hydraulic excavator) a working tool of which is a crusher. Each of the embodiments is only an example, and a partial replacement or combination of the components shown in the different embodiments is made possible without mentioning.

DESCRIPTION OF REFERENCE NUMERALS

1: Hydraulic excavator (Construction machine)
2: Lower traveling structure (Vehicle body)
5: Upper revolving structure (Vehicle body)
13: Engine
14A: Intake manifold
17A: Exhaust manifold
19: EGR pipe
20: EGR valve
22: EGR valve inlet side pressure sensor
23: EGR valve outlet side pressure sensor
27: Exhaust gas purifying device
30: Particulate matter removing filter (Filter)
31: Regeneration device
34: Filter inlet side pressure sensor
35: Filter outlet side pressure sensor
38, 41: Control device (Engine controller, EGR controller, Regeneration controller)
38A, 41A: Engine controller
38B, 41B: EGR controller
38C, 41C: Regeneration controller
38D, 41D: Memory (Storage section)
42: Atmospheric pressure sensor

The invention claimed is:

1. A construction machine comprising:
an engine that is mounted on a vehicle body;
an engine controller that performs control of the engine;
an intake manifold that intakes outside air into the engine;
an exhaust manifold that exhausts an exhaust gas from the engine;
an exhaust gas recirculation (EGR) pipe that recirculates a part of the exhaust gas in the exhaust manifold from the exhaust manifold to the intake manifold;
an EGR valve that is provided in the EGR pipe to adjust a flow quantity of the exhaust gas passing through the EGR pipe;
an EGR valve inlet side pressure sensor that is provided in an inlet side of the EGR valve;
an EGR valve outlet side pressure sensor that is provided in an outlet side of the EGR valve;
an EGR controller that calculates a differential pressure between a pressure value detected by the EGR valve inlet side pressure sensor and a pressure value detected by the EGR valve outlet side pressure sensor and performs control of an opening degree of the EGR valve based upon this differential pressure;
an exhaust gas purifying device that is provided in an exhaust side of the engine and has a filter that traps particulate matter in the exhaust gas exhausted from the engine;
a regeneration device that performs regeneration treatment of the filter by burning the particulate matter trapped in the filter of the exhaust gas purifying device, the regeneration device including:
a filter inlet side pressure sensor that is provided in an inlet side of the filter;
a filter outlet side pressure sensor that is provided in an outlet side of the filter; and
a regeneration controller that calculates a differential pressure between a pressure value detected by the filter inlet side pressure sensor and a pressure value detected by the filter outlet side pressure sensor and performs control of the regeneration treatment of the filter based upon this differential pressure,
wherein
the regeneration controller determines whether or not the filter inlet side pressure sensor is in failure based upon a difference between the pressure value detected by the filter inlet side pressure sensor and the pressure value detected by the EGR valve inlet side pressure sensor; and
when it is determined that the filter inlet side pressure sensor is in failure, the regeneration controller performs the control of the regeneration treatment using a differential pressure calculated based upon the pressure value detected by the EGR valve inlet side pressure sensor and the pressure value detected by the filter outlet side pressure sensor.

2. The construction machine according to claim 1, wherein
the regeneration controller makes a determination on whether or not the filter inlet side pressure sensor is in failure when the engine is driving.

3. The construction machine according to claim 1, wherein
an atmospheric pressure sensor that detects an atmospheric pressure is connected to the regeneration controller,
the regeneration controller determines whether or not the filter inlet side pressure sensor is in failure based upon a difference between a pressure value detected by the atmospheric pressure sensor and a pressure value detected by the filter inlet side pressure sensor before starting the engine,
even when it is determined that the filter inlet side pressure sensor is not in failure by the determination on the failure before this start, the regeneration controller determines whether or not the filter inlet side pressure sensor is in failure based upon the difference between the pressure value detected by the filter inlet side pressure sensor and the pressure value detected by the EGR valve inlet side pressure sensor.

4. The construction machine according to claim 1, wherein
when the difference between the pressure value detected by the filter inlet side pressure sensor and the pressure value detected by the EGR valve inlet side pressure sensor is equal to or more than a preset failure determining threshold value, the regeneration controller determines that the filter inlet side pressure sensor is in failure.

5. The construction machine according to claim 1, wherein
the regeneration controller:
estimates a first estimated trapping quantity of the particulate matter trapped in the filter based upon the differential pressure at least between the pressure value detected by the filter inlet side pressure sensor and the pressure value detected by the filter outlet side pressure sensor;
estimates a second estimated trapping quantity of the particulate matter trapped in the filter based upon at least a rotational speed of the engine and a fuel injection quantity;
determines whether to perform the regeneration treatment based upon whether or not at least any one between the first estimated trapping quantity and the second estimated trapping quantity is equal to or more than a preset trapping quantity threshold value;
when it is determined that the filter inlet side pressure sensor is in failure, estimates the first estimated trapping quantity using the differential pressure calculated based upon the pressure value detected by the EGR valve inlet side pressure sensor and the pressure value detected by the filter outlet side pressure sensor; and
when it is determined that the filter inlet side pressure sensor is not in failure, estimates the first estimated trapping quantity using the differential pressure calculated based upon the pressure value detected by the filter inlet side pressure sensor and the pressure value detected by the filter outlet side pressure sensor.

6. The construction machine according to claim 1, wherein
a map showing a relation of the pressure value detected by the filter inlet side pressure sensor and the pressure value detected by the EGR valve inlet side pressure sensor when both of the filter inlet side pressure sensor and the EGR valve inlet side pressure sensor are not in failure is stored in the regeneration controller; and
when it is determined that the filter inlet side pressure sensor is in failure, the regeneration controller calculates a pressure value estimated to be present at the filter inlet side pressure sensor from a pressure value detected by the EGR valve inlet side pressure sensor based upon this map, and performs the control of the regeneration treatment using a differential pressure calculated based upon the pressure value estimated to be present at the filter inlet side pressure sensor and the pressure value detected by the filter outlet side pressure sensor.

* * * * *